United States Patent
Santini et al.

(10) Patent No.: US 6,757,141 B2
(45) Date of Patent: Jun. 29, 2004

(54) PERPENDICULAR RECORDING WRITE HEAD WITH A FERROMAGNETIC SHAPING LAYER

(75) Inventors: Hugo Alberto Emilio Santini, San Jose, CA (US); Mason Lamar Williams, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 223 days.

(21) Appl. No.: 10/054,553

(22) Filed: Jan. 18, 2002

(65) Prior Publication Data

US 2003/0137779 A1 Jul. 24, 2003

(51) Int. Cl.[7] .......................... G11B 5/127; G11B 5/39
(52) U.S. Cl. ........................... 360/317; 360/126
(58) Field of Search .................... 360/125, 126, 360/122, 317

(56) References Cited

U.S. PATENT DOCUMENTS

| 4,404,609 A | 9/1983 | Jones, Jr. ............... 360/126 |
| 4,974,110 A | 11/1990 | Kanamine et al. ........ 360/126 |
| 5,225,953 A | 7/1993 | Wada et al. ............ 360/126 |
| 6,072,669 A | 6/2000 | Indeck ................. 360/121 |
| 6,195,233 B1 | 2/2001 | Akiyama et al. ......... 360/126 |
| 6,504,675 B1 * | 1/2003 | Shukh et al. ........... 360/125 |
| 2002/0024765 A1 * | 2/2002 | Kutsuzawa et al. ....... 360/126 |
| 2002/0026704 A1 * | 3/2002 | Stageberg et al. ....... 29/603.12 |
| 2002/0034043 A1 * | 3/2002 | Okada et al. ........... 360/125 |
| 2002/0176214 A1 * | 11/2002 | Shukh et al. ........... 360/317 |

FOREIGN PATENT DOCUMENTS

| JP | 01078451 A | * | 3/1989 | ............ G11B/13/00 |
| JP | 01133211 A | * | 5/1989 | ............ G11B/5/31 |
| JP | 01133212 A | * | 5/1989 | ............ G11B/5/31 |
| JP | 2000339624 A | * | 12/2000 | ............ G11B/5/31 |
| JP | 2001283410 A | * | 10/2001 | ............ G11B/5/31 |

* cited by examiner

Primary Examiner—William Klimowicz
(74) Attorney, Agent, or Firm—Ervin F. Johnston

(57) ABSTRACT

A perpendicular recording head has a second pole piece which includes a bottom ferromagnetic shaping layer and a top ferromagnetic probe layer. Each of these layers has a flare point where the layers first commence to widen after the ABS with the flare point of the shaping layer being located between an air bearing surface (ABS) of the head and the flare point of the probe layer. Further, the probe layer has a probe at the ABS which has a decreasing width from its top to its bottom to provide a trapezoidal shape which minimizes side writing due to skew of the probe at outermost and innermost circular tracks of a rotating magnetic disk.

40 Claims, 17 Drawing Sheets

PERPENDICULAR RECORDING WRITE HEAD WITH A FERROMAGNETIC SHAPING LAYER

BACKGROUND OF THE INVENTION

1. Field of the Invention

The present invention relates to a perpendicular recording write head with a ferromagnetic shaping layer and, more particularly, to such a write head wherein the shaping layer provides a planarized surface for the construction of a probe layer and supplies flux to a probe of the probe layer very close to an air bearing surface (ABS).

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm urges the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic field signals from the rotating disk. The read and write heads are connected to processing circuitry that operates according to a computer program to implement the writing and reading functions.

A write head typically employs ferromagnetic first and second pole pieces which are capable of carrying flux signals for the purpose of writing the magnetic impressions into the track. Each of the first and second pole pieces has a pole tip, a yoke and a back gap with the yoke being located between the pole tip and the back gap. The pole tips are located at the ABS and the back gaps are magnetically connected at a recessed location within the write head. At least one coil layer is embedded in an insulation stack between the yokes of the first and second pole pieces. A nonmagnetic write gap layer is located between the pole tips. Processing circuitry digitally energizes the write coil which induces flux signals into the first and second pole pieces. The flux signals bridge across the write gap layer at the ABS so as to write the aforementioned magnetic impressions or bits into the track of the rotating disk.

The first and second pole pieces are typically fabricated by frame plating. Photoresist is employed to provide the frame and a seed layer is employed to provide a return path for the plating operation. A typical sequence for fabricating a pole piece is to sputter clean the wafer, sputter deposit a seed layer, such as nickel iron, on the wafer, spin a layer of photoresist on the wafer, light-image the photoresist layer through a mask to expose areas of the photoresist that are to be removed (assuming that the photoresist is a positive photoresist), develop the photoresist to remove the light-exposed areas to provide an opening in the photoresist and then plate the pole piece in the opening up to a desired height.

A write head is typically rated by its areal density which is a product of its linear bit density and its track width density. The linear bit density is the number of bits which can be written per linear inch along the track of the rotating magnetic disk and the track width density is the number of tracks that can be written per inch along a radius of the rotating magnetic disk. The linear bit density is quantified as bits per inch (BPI) and the track width density is quantified as tracks per inch (TPI). The linear bit density depends upon the length of the bit along the track and the track width density is dependent upon the width of the second pole tip at the ABS. Efforts over the years to increase the areal density have resulted in computer storage capacities increasing from kilobytes to megabytes to gigabytes.

The magnetic moment of each pole piece is parallel to the ABS and to the major planes of the layers of the write head. When the write current is applied to the coil of the write head the magnetic moment rotates toward or away from the ABS, depending upon whether the write signal is positive or negative. When the magnetic moment is rotated from the parallel position, the aforementioned magnetic flux fringes across the write gap layer between the first and second pole pieces impressing a positive or negative bit in the track of the rotating magnetic disk. As the write current frequency is increased, the linear bit density is also increased. An increase in the linear bit density is desirable in order to increase the aforementioned areal density which provides a computer with increased storage capacity.

There are two types of magnetic write heads. One type is a longitudinal recording write head, which is described hereinabove, and the other type is a perpendicular recording write head. In the longitudinal recording write head the flux induced into the pole pieces by the write coil fringes across the write gap layer into the circular track of the rotating magnetic disk. This causes an orientation of the magnetization in the circular disk to be parallel to the plane of the disk which is referred to as longitudinal recording. The volume of the magnetization in the disk is referred to as a bit cell and the magnetizations in various bit cells are antiparallel so as to record information in digital form. The bit cell has a width representing track width, a length representing linear density and a depth which provides the volume necessary to provide sufficient magnetization to be read by a sensor of the read head. In longitudinal recording magnetic disks this depth is somewhat shallow. The length of the bit cell along the circular track of the disk is determined by the thickness of the write gap layer. A write gap layer is made as thin as practical so as to decrease the length of the bit cell along the track which increases the linear density of the recording. The width of the second pole tip of the longitudinal write head is also made as narrow as possible so as to reduce the track width and thereby increase the track width density. Unfortunately, the reduction in the thickness of the write gap layer and the track width is limited because the bit cell is shallow and there must be sufficient bit cell volume in order to produce sufficient magnetization in the recorded disk to be read by the sensor of the read head.

In a perpendicular recording write head there is no write gap layer. In a perpendicular write head the second pole piece comprises a probe layer wherein the probe layer has a probe with a width that defines the track width of the write head and a wider yoke portion which delivers the flux to the probe. At a recessed end of the probe the yoke flares laterally outwardly to its fall width and thence to a back gap which is magnetically connected to a back gap of the first pole piece. The perpendicular write head records signals into a perpendicular recording magnetic disk which are significantly thicker than a longitudinal recording magnetic disk. In the perpendicular recording magnetic disk a soft magnetic layer underlies a thicker perpendicular recording layer which has a high saturation magnetization $M_S$ and a high coercivity $H_C$. The thicker disk permits a larger bit cell so that the length and the width of the cell can be decreased and still provide sufficient magnetization to be read by the read head. This means that the width and the thickness or height of the probe at the ABS can be reduced to increase the aforementioned TPI and BPI. The magnetization of the bit cell in a perpendicular recording scheme is perpendicular to the plane of the disk as contrasted to parallel to the plane of the disk in the longitudinal recording scheme. The flux from the probe is injected into the perpendicular recording magnetic disk in a direction perpendicular to the plane of the disk, thence parallel to the plane of the disk in the aforementioned soft magnetic underlayer and thence again perpendicular to the plane of the disk into the first pole piece to complete the magnetic circuit. It is now readily apparent that the width of the probe can be less than the width of the second pole tip of the longitudinal write head and the height or thickness of the probe can be less than the length of the longitudinal recorded bit cell so as to significantly increase the aforementioned areal density of the write head.

SUMMARY OF THE INVENTION

The probe layer is typically constructed by the aforementioned frame plating in the same manner as construction of the second pole piece in a longitudinal recording head. It is desirable that the length of the probe between the ABS and a flare point of the probe layer, where the second pole first commences to widen after the ABS, be short so as to minimize a fully saturated probe length and thereby increase the write signal frequency so as to increase the linear density of the recording. Unfortunately, when the probe length is short it is difficult to fabricate a narrow width probe because of the loss of resolution of the probe in a region where the probe meets the flared portion of the probe layer. This can only be overcome by lengthening the probe which reduces the write frequency and the linear density of the recording head. This problem has been overcome by providing a ferromagnetic shaping layer immediately below the probe layer with a flare point which is located between the flare point of the probe layer and the ABS. In this manner the length of the probe may be sufficiently long so that the low resolution portion of the probe next to the flared portion of the probe layer is recessed and will not affect the resolution of the probe portion next to the ABS when frame plating is employed for its construction. The shaping layer can also be planarized with an insulation layer between the shaping layer and the ABS so as to provide a desirable planar surface for high resolution fabrication of the probe.

Another aspect of the invention is to fabricate the probe with a narrow track width by a reverse imaging process. This reverse imaging process is another way to obtain high resolution fabrication of the probe even when the probe length is not increased to improve its resolution when constructed by frame plating, as discussed hereinabove. In the reverse imaging process frame plating is employed to fabricate the probe with a probe material layer that has a width larger than the desired track width of the write head. For instance, the probe material layer could be full film plated. A hard mask layer is formed on top of the probe material layer of a material such as carbon or alumina followed by formation of a resist layer on the hard mask layer with a width equal to the desired track width. Milling is then employed to remove exposed portions of the hard mask layer and then ion milling is employed to mill exposed portions of the probe material layer, thus defining the probe with the desired track width. In a preferred embodiment the ion milling is at an angle to a normal to the plane of the probe layer while the probe layer is rotated about the normal. This causes the side walls of the probe layer to be sloped inwardly from the top to the bottom of the probe. Accordingly, the probe is trapezoidal shaped at the ABS which minimizes side writing of the probe in tracks at the outer radius and inner radius of the rotating magnetic disk as the disk is rotated.

An object of the present invention is to provide a more well-defined probe for a perpendicular recording head.

Another object is to provide a probe with a sufficient length from the ABS into the head so that the probe can be well-defined by frame plating without reducing the write signal frequency.

A further object is to construct a probe by a reverse imaging process which does not require the probe length to be lengthened in order to obtain a high resolution probe when constructed by frame plating.

Still another object is to provide a reverse imaging process for constructing a probe with a trapezoidal shape at the ABS so as to minimize side writing.

Still a further object is to provide a method of making each of the probes set forth hereinabove.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
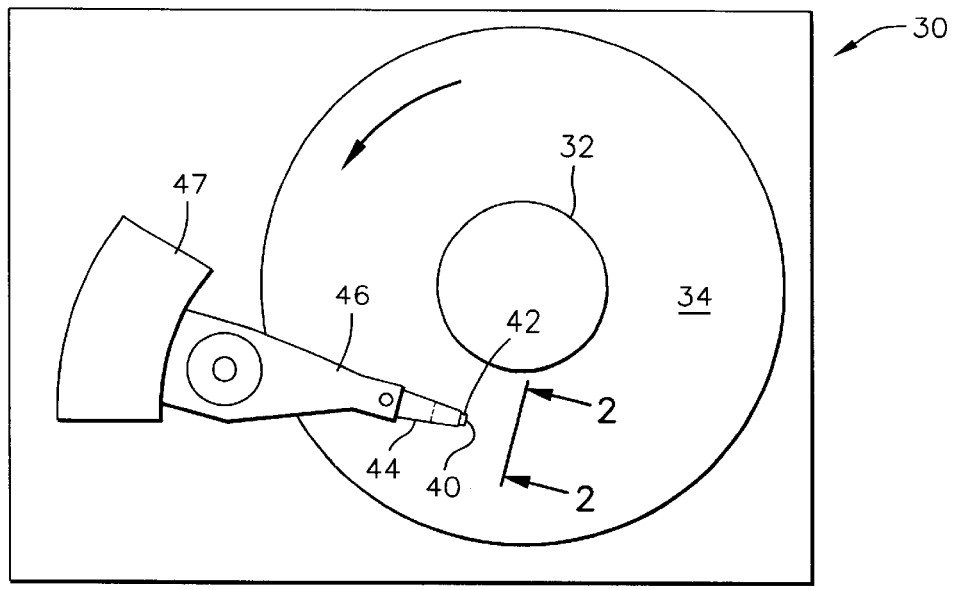
FIG. 1 is a plan view of an exemplary prior art magnetic disk drive.
Figure 2:
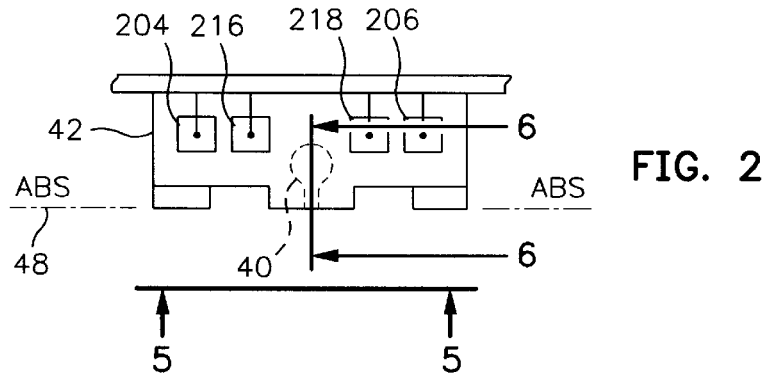
FIG. 2 is an end view of a prior art slider with a magnetic head of the disk drive as seen in plane 2—2 of FIG. 1.
Figure 3:
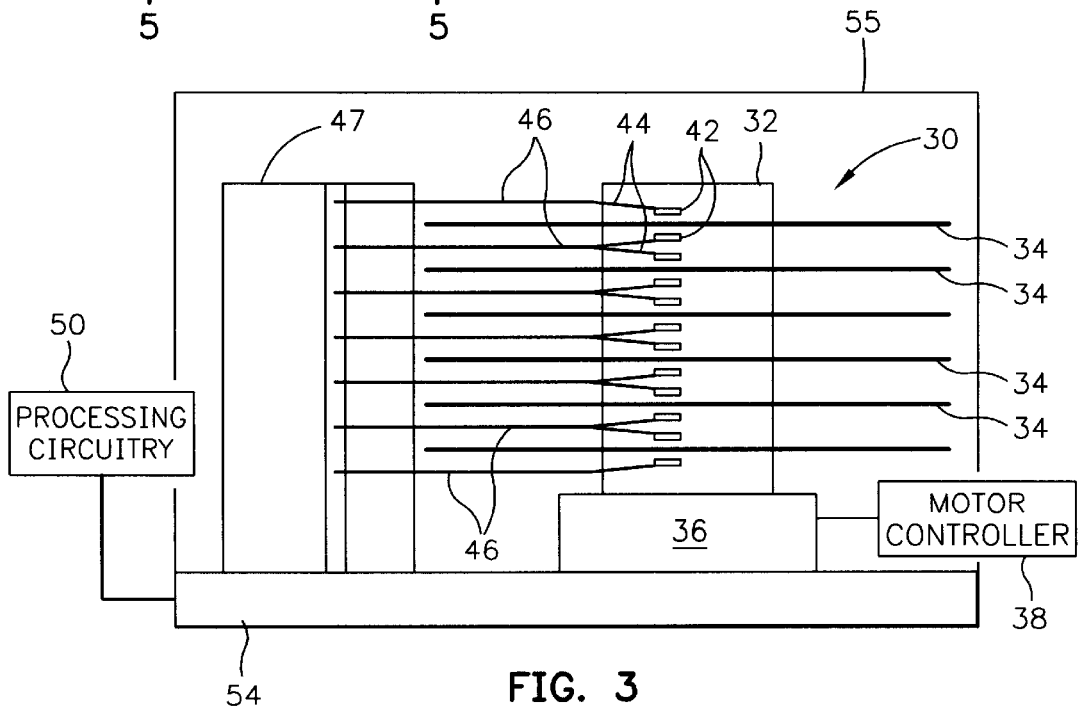
FIG. 3 is an elevation view of the prior art magnetic disk drive wherein multiple disks and magnetic heads are employed.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34.

Figure 4:
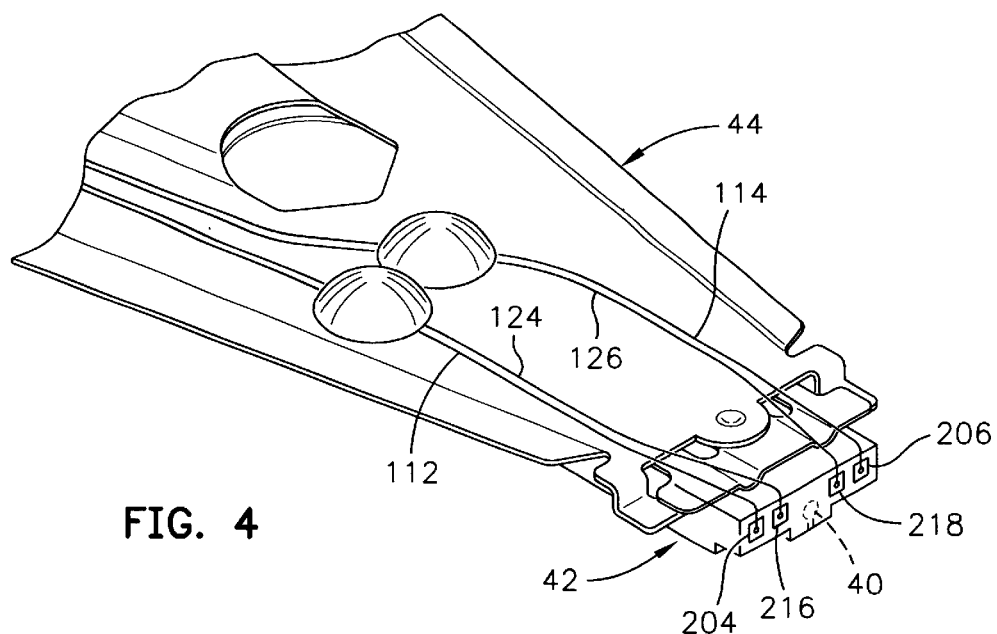
FIG. 4 is an isometric illustration of an exemplary prior art suspension system for supporting the slider and magnetic head.

When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
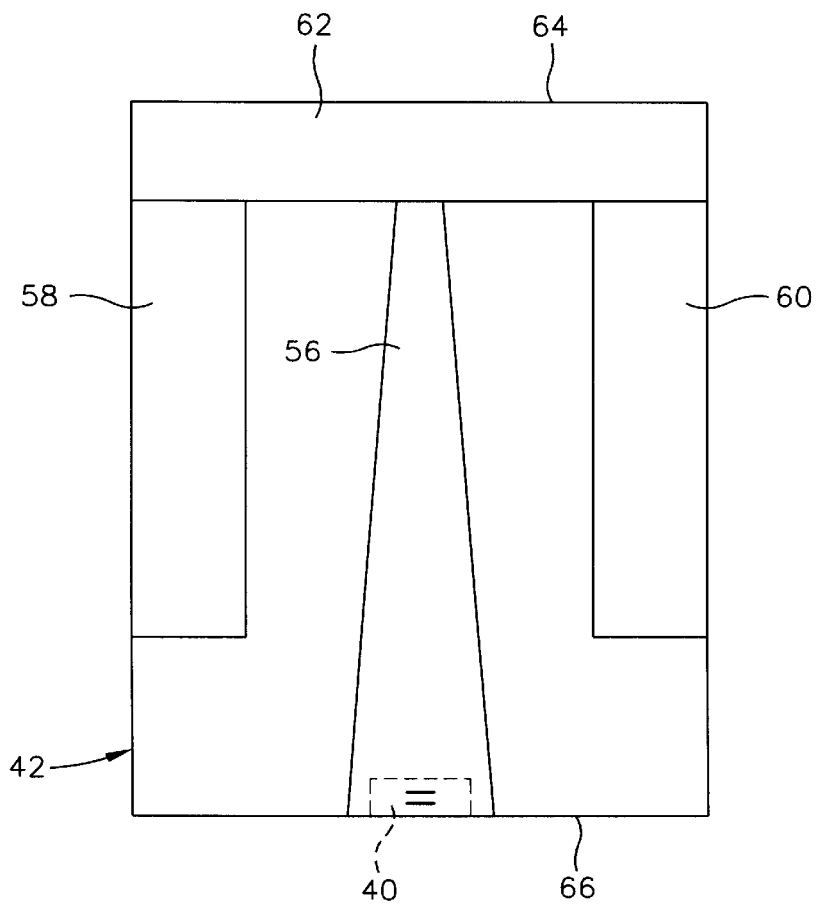
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
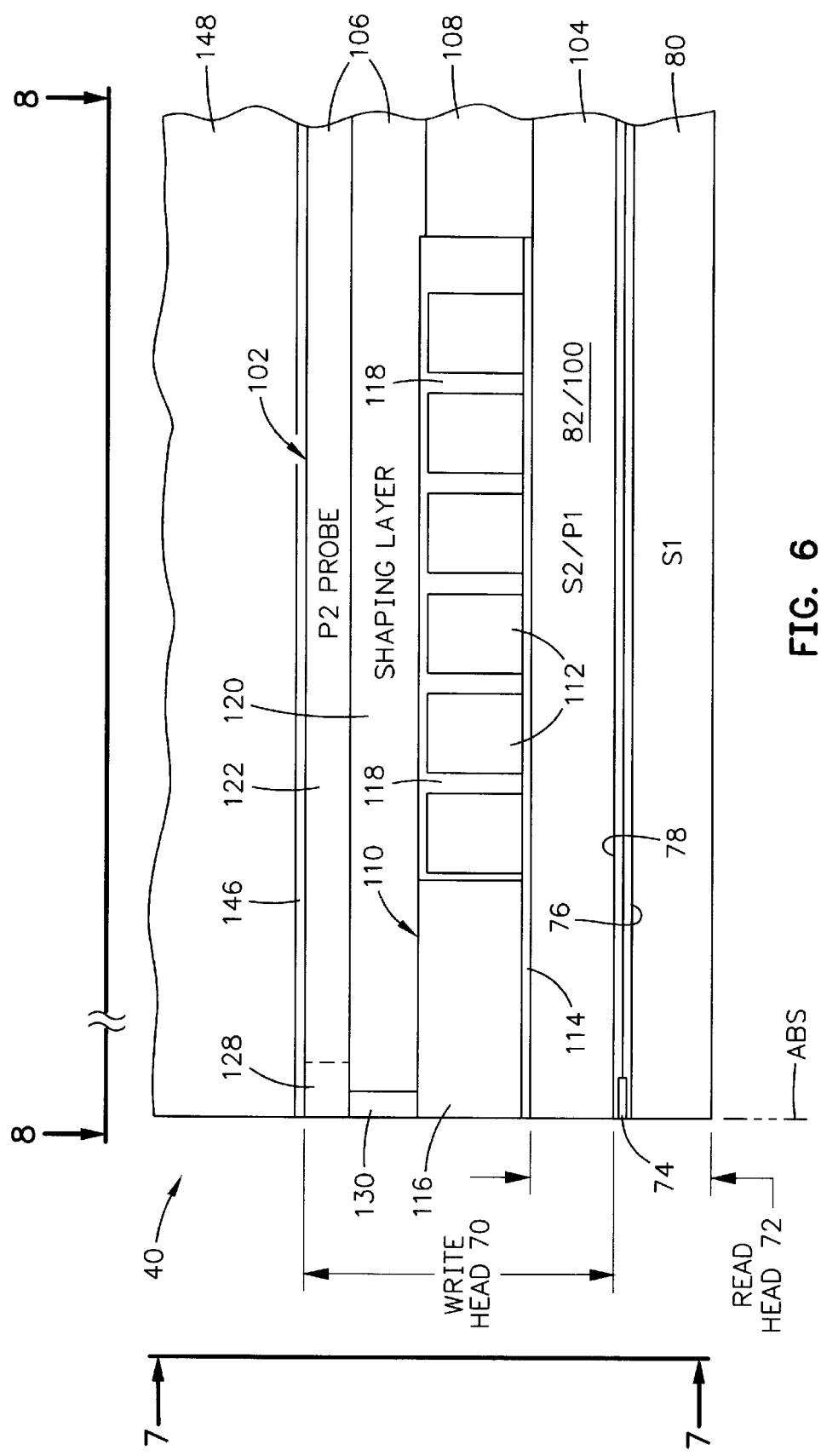
FIG. 6 is a longitudinal cross-sectional view of the slider taken along plane 6—6 of FIG. 2 showing the present perpendicular recording head in combination with a read head.
Figure 7:
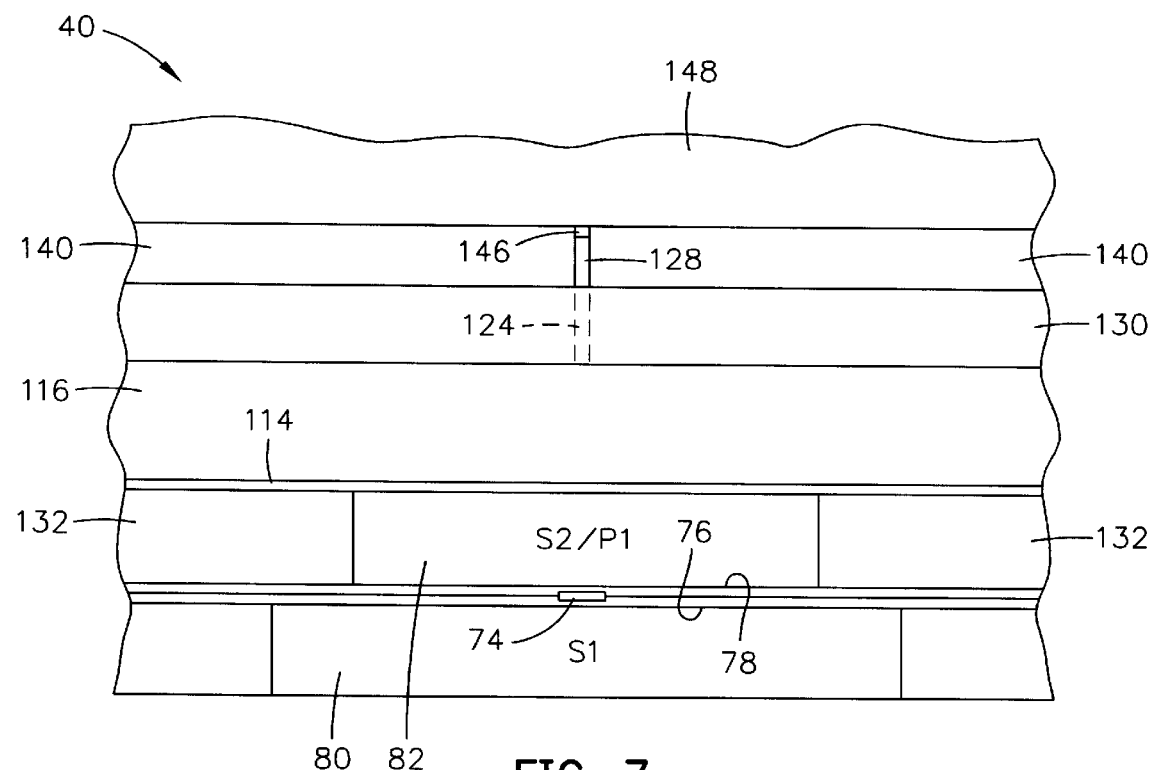
FIG. 7 is an ABS view of the slider taken along plane 7—7 of FIG. 6.

FIG. 6 is a side cross-sectional elevation view of a merged magnetic head assembly 40, which includes a write head portion 70 and a read head portion 72, the read head portion employing a read sensor 74. FIG. 7 is an ABS view of FIG. 6. The sensor 74 is sandwiched between nonmagnetic electrically nonconductive first and second read gap layers 76 and 78, and the read gap layers are sandwiched between ferromagnetic first and second shield layers 80 and 82. In response to external magnetic fields, the resistance of the sensor 74 changes. A sense current $I_S$ (not shown) conducted through the sensor causes these resistance changes to be manifested as potential changes. These potential changes are then processed as readback signals by the processing circuitry 50 shown in FIG. 3.

As shown in FIGS. 6 and 7, the write head portion 70 includes first and second pole pieces 100 and 102 which extend from the ABS to back gap portions 104 and 106 which are recessed in the head and which are magnetically connected to a back gap layer 108. Located between the first and second pole pieces 100 and 102 is an insulation stack 110 which extends from the ABS to the back gap layer 108 and has embedded therein at least one write coil layer 112. The insulation stack 110 may have a bottom insulation layer 114 and insulation layers 116 and 118 which insulate the write coil layer from the second pole piece 102, respectively.

Figure 8:
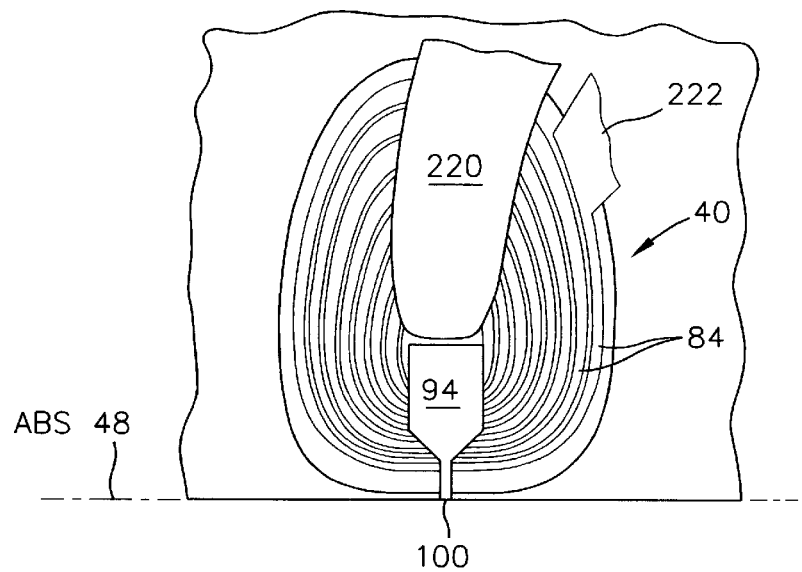
FIG. 8 is a view taken along plane 8—8 of FIG. 6 with all material above the coil layer and leads removed.

Since the second shield layer 82 and the first pole piece layer 100 are a common layer this head is known as a merged head. In a piggyback head the second shield layer and the first pole piece layer are separate layers which are separated by a nonmagnetic layer. As shown in FIGS. 2 and 4, first and second solder connections 204 and 206 connect leads from the spin valve sensor 74 to leads 212 and 214 on the suspension 44, and third and fourth solder connections 216 and 218 connect leads 220 and 222 from the coil 84 (see FIG. 8) to leads 224 and 226 on the suspension.

Figure 9:
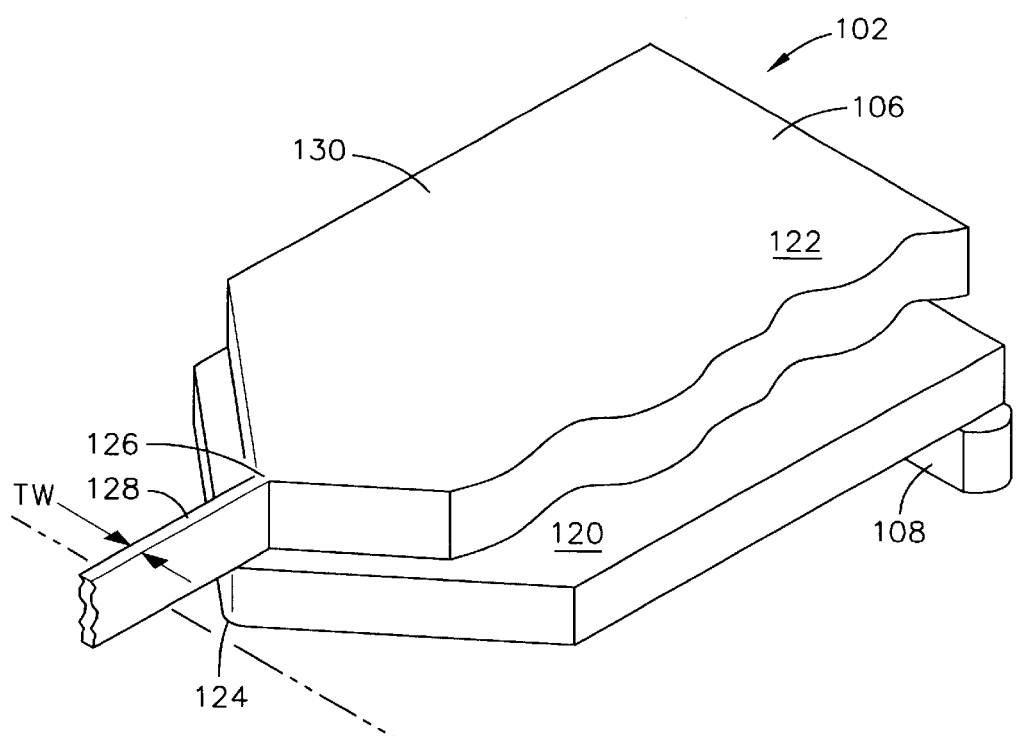
FIG. 9 is an isometric view of a preferred second pole piece of FIG. 6 which includes a bottom shaping layer and a top probe layer.
Figure 10:
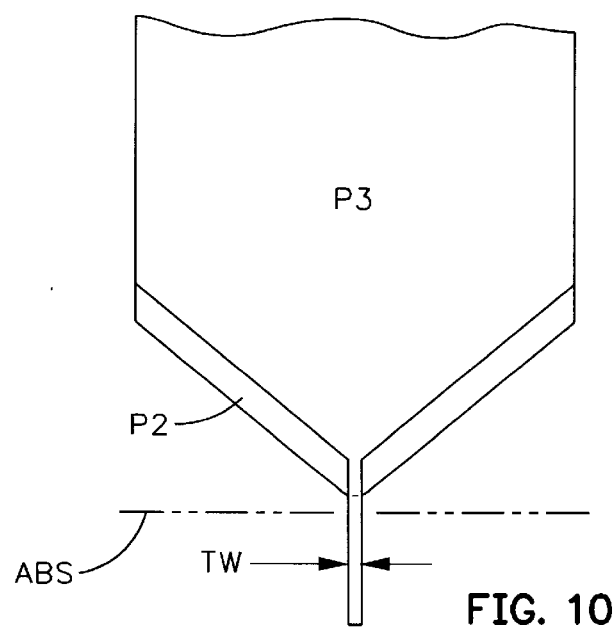
FIG. 10 is a top view of FIG. 9.
Figure 11:
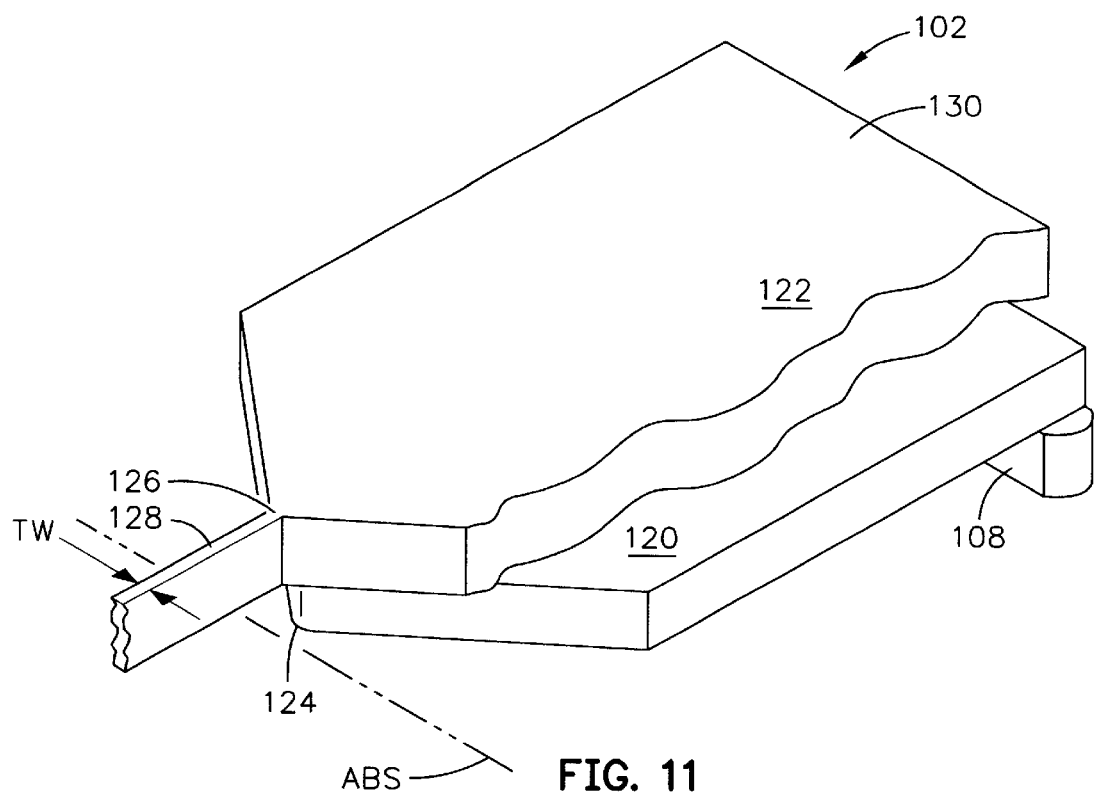
FIG. 11 is an isometric view of another embodiment of the second pole piece of FIG. 6, the bottom shaping layer and the top probe layer.
Figure 12:
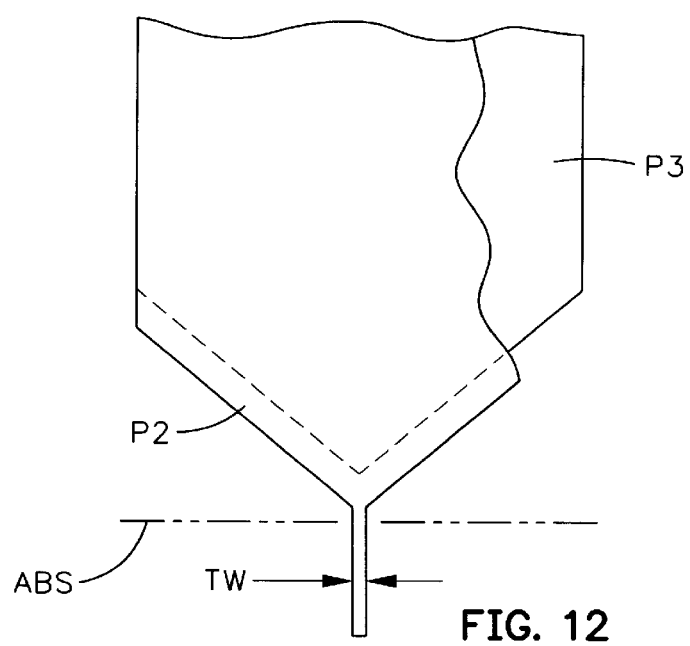
FIG. 12 is a top view of FIG. 11.

As shown in FIGS. 9 and 10, the second pole piece 102 includes a bottom ferromagnetic shaping layer 120 and a top ferromagnetic probe layer 122. The shaping and probe layers 120 and 122 have flare points 124 and 126 where the layers first commence to extend laterally outwardly after the ABS. The probe layer 122 has a probe 128 and a yoke 130 wherein the yoke includes the flared portion and back gap portion 106. The width of the top of the probe 128 is the track width (TW) of the recording head. The probe 128 is shown extended forward of the ABS since this is its configuration when it is partially constructed on a wafer where rows and columns of magnetic head assemblies are fabricated. After completion of the magnetic head assemblies, which will be discussed hereinafter, the head assemblies are diced into rows of magnetic head assemblies and lapped to the ABS shown in FIG. 9. Each row of magnetic head assemblies is then diced into individual head assemblies and mounted on the suspensions, as shown in FIG. 3. In a preferred embodiment the flare point 124 of the shaping layer is located between the ABS and the flare point 126 of the probe layer. In this manner the flare point 124 of the shaping layer is located close to the ABS, such as 0.25 $\mu$m to 1.5 $\mu$m from the ABS for 0.5 $\mu$m track widths for conducting the flux to the probe with a very short extension of the probe extending from the flare point 124 of the shaping layer to the ABS. Accordingly, the very highly saturated portion of the probe 128 is maintained short so that the write coil frequency can be increased to increase the linear density of the bits along the circular track of the rotating magnetic disk. Another embodiment of a second pole piece 102 is illustrated in FIGS. 11 and 12 wherein the flare point 126 of the probe layer is located between the flare point 124 of the shaping layer and the ABS. While this is not a preferred arrangement of the present invention it is still within the spirit of the invention.

As shown in FIGS. 6 and 7, an insulation layer 130 is located between the flare point and forward portions of the shaping layer 120 and the ABS. The insulation layer 130 is not a write gap layer as employed in a longitudinal recording head and therefore does not determine the linear bit density along the track of the rotating magnetic disk. In contrast, the thickness or height of the probe 128 determines the linear bit density since the flux signal magnetizes the bit cells in the recording disk in a perpendicular direction with the flux from the second pole piece returning to the first pole piece 100 via a soft magnetic layer in the perpendicular recording disk.

It should be noted that when the shaping layer 120 is employed, as shown in FIG. 9, the length of the head assembly 40 between the ABS and the back gap 108 can be shortened so that the write coil frequency can be increased for further increasing the linear bit density of the write head. It should also be understood that the magnetic head assembly may include multiple write coil layers which are stacked one above the other instead of a single write coil layer, as shown in FIG. 6, and still be within the spirit of the invention.

Method of Making

Figure 13A:
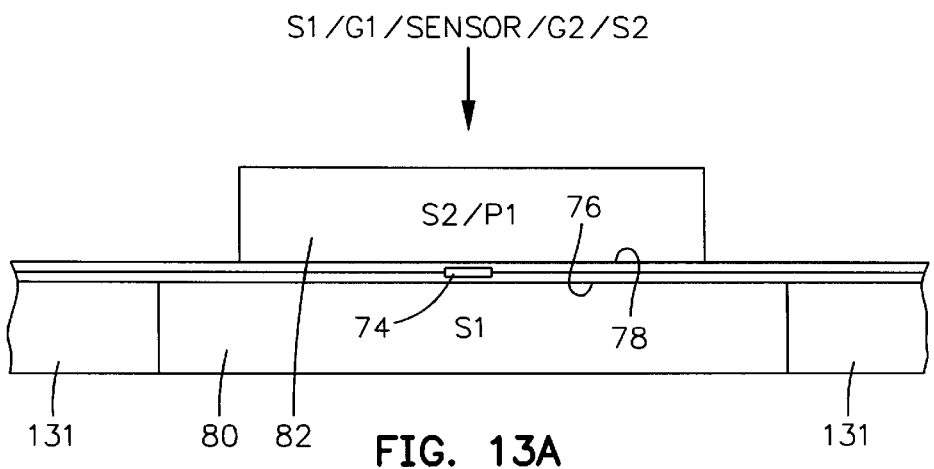
FIGS. 13A and 13B are an ABS view and a longitudinal cross-sectional view respectively of the fabrication of the read head portion of the head assembly in FIG. 6.
Figure 13B:
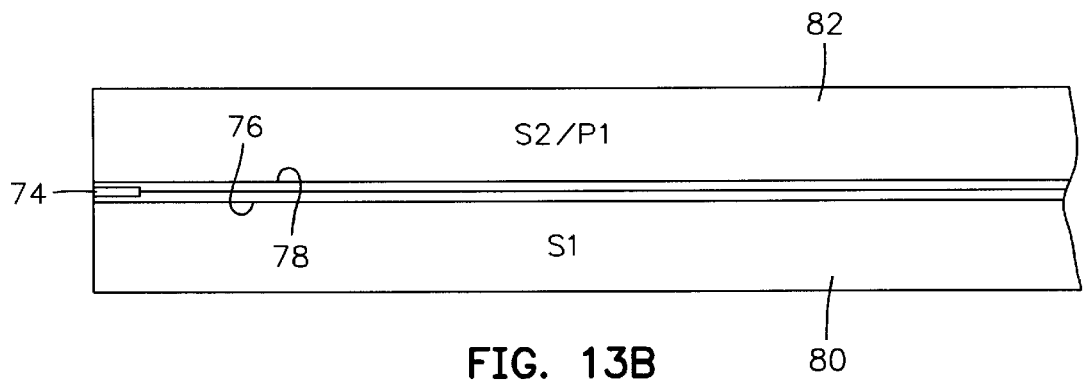
Figure 14A:
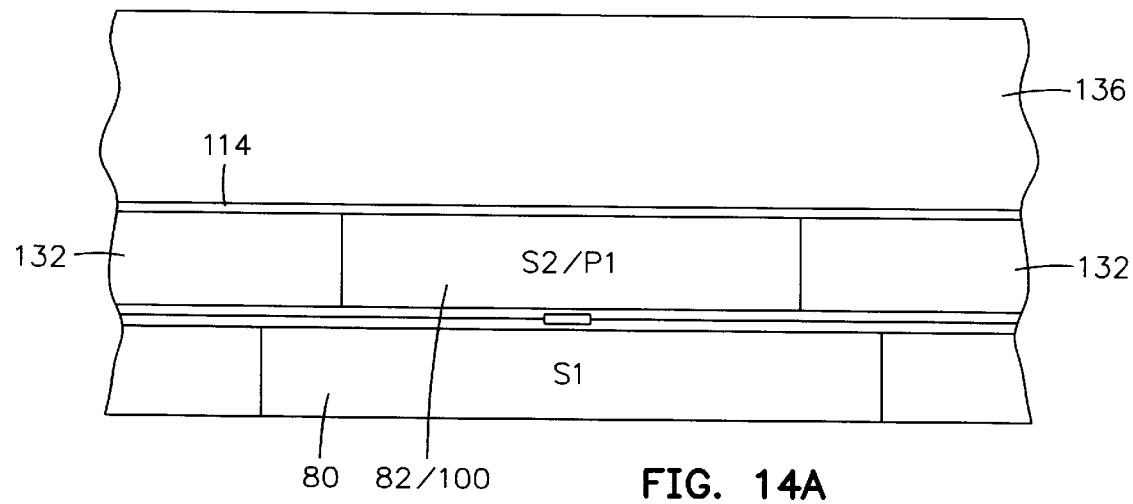
FIGS. 14A and 14B are the same as FIGS. 13A and 13B except the first pole piece in FIGS. 13A and 13B has been planarized, the write coil and insulation layer and the back gap have been constructed and a thick layer of alumina has been formed.
Figure 14B:
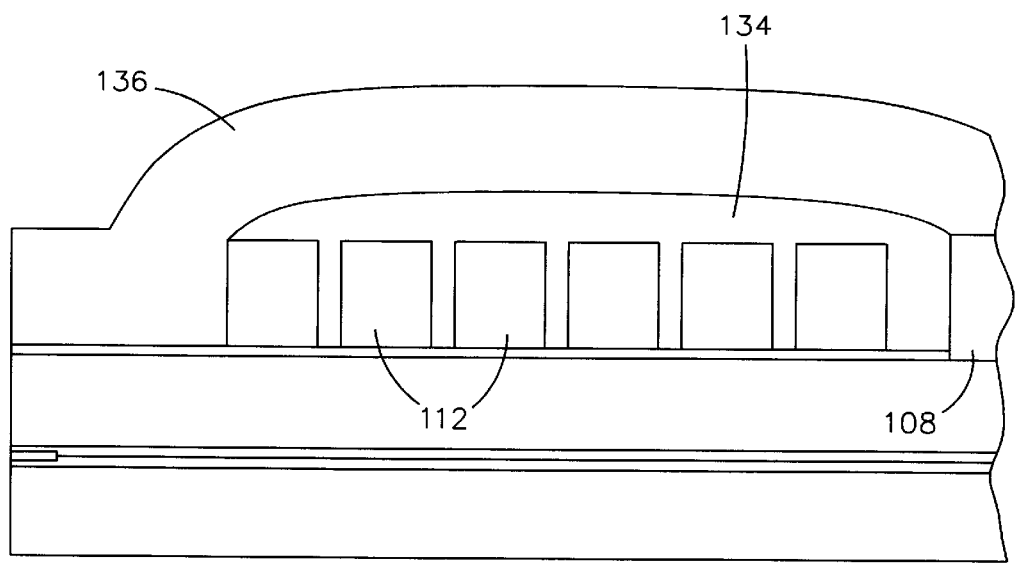
Figure 15A:
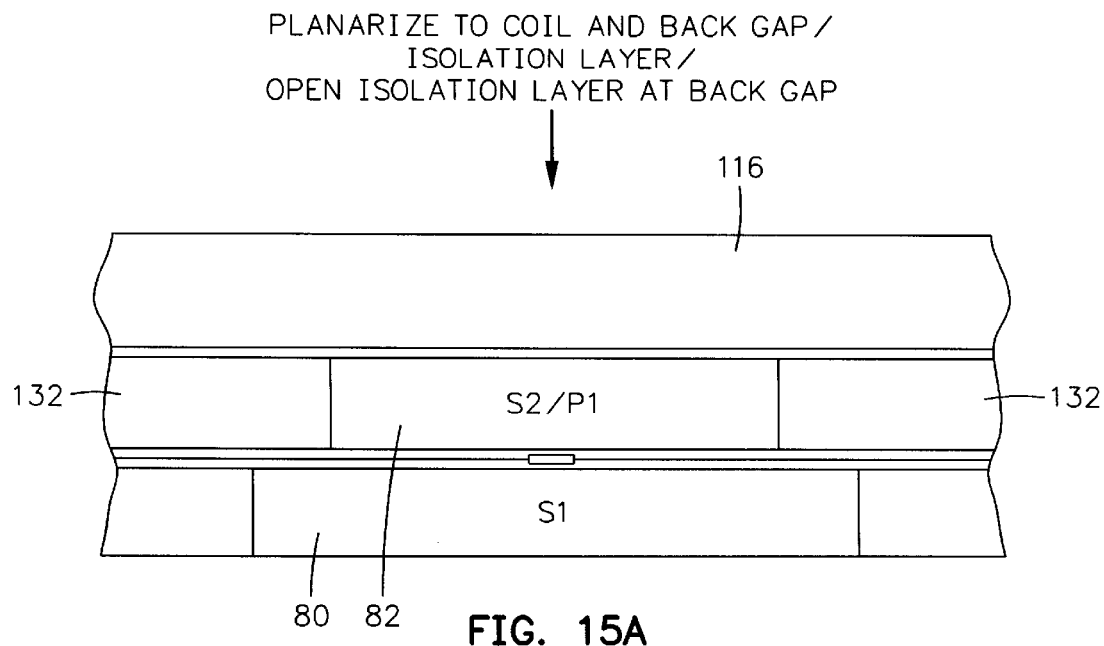
FIGS. 15A and 15B are the same as FIGS. 14A and 14B except the write coil and the thick alumina layer have been planarized and an isolation layer has been formed.
Figure 15B:
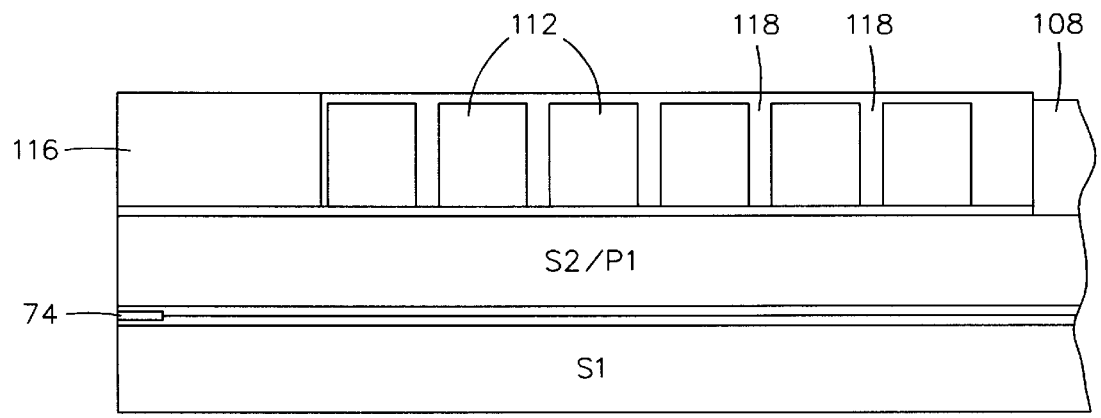

FIGS. 13A and 13B to FIGS. 21A and 21B illustrate various steps in the fabrication of the magnetic head assembly 40 shown in FIGS. 6 and 7. In FIGS. 13A and 13B the first and second shield layers 80 and 82 may be fabricated by well-known frame plating techniques and the first and second read gap layers 76 and 78 and the sensor 74 may be fabricated by well-known vacuum deposition techniques. The first shield layer 80 has been planarized with an alumina layer 131. In FIGS. 14A and 14B a thick layer of alumina is deposited (not shown) and planarized to layer 82/100 leaving an insulation layer 132. The insulation layer 114 above the first shield/first pole piece layer 82/100 is then formed. As shown in FIG. 14B, a back portion of the insulation layer 114 is removed by ion milling (not shown) so that the back gap layer 108 can be frame plated. A photoresist layer 134 is then formed on the write coil layer 112 and a thick alumina layer 136 is formed over the entire wafer. In FIGS. 15A and 15B the wafer is planarized to form the aforementioned insulation layers 116 and 118 leaving the back gap 108 exposed.

Figure 16A:
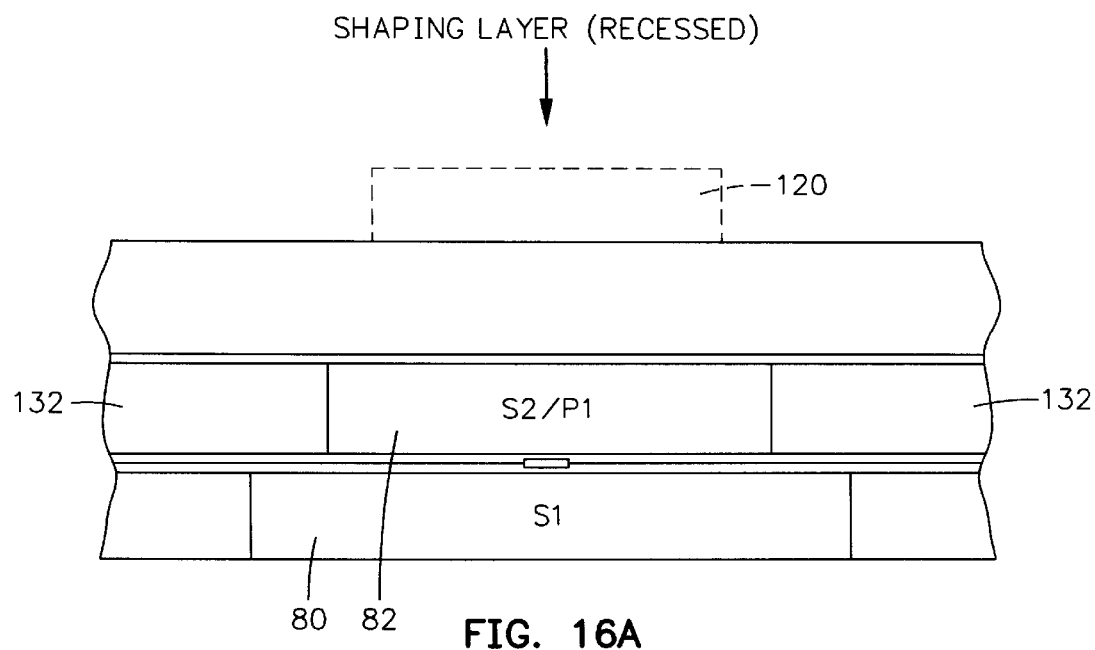
FIGS. 16A and 16B are the same as FIGS. 15A and 15B except a shaping layer has been formed.
Figure 16B:
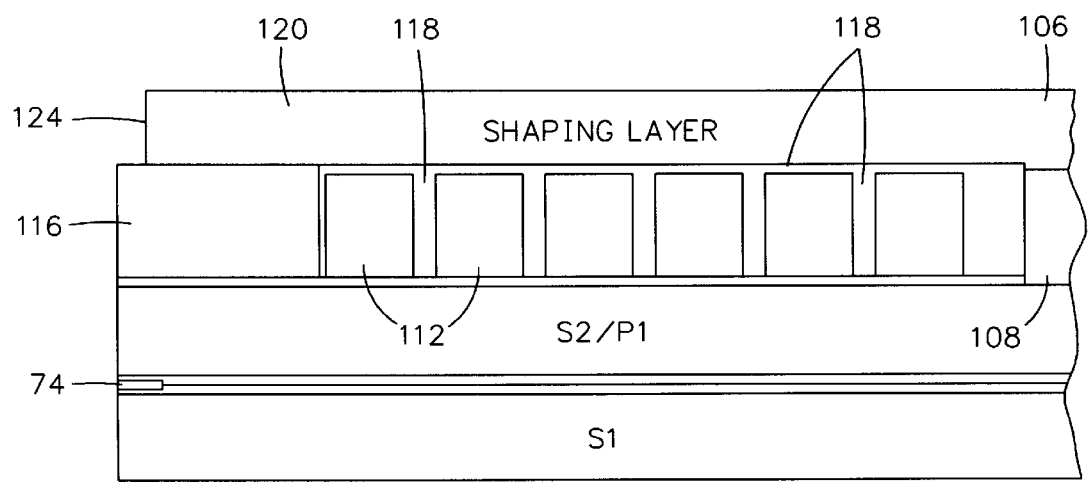
Figure 17A:
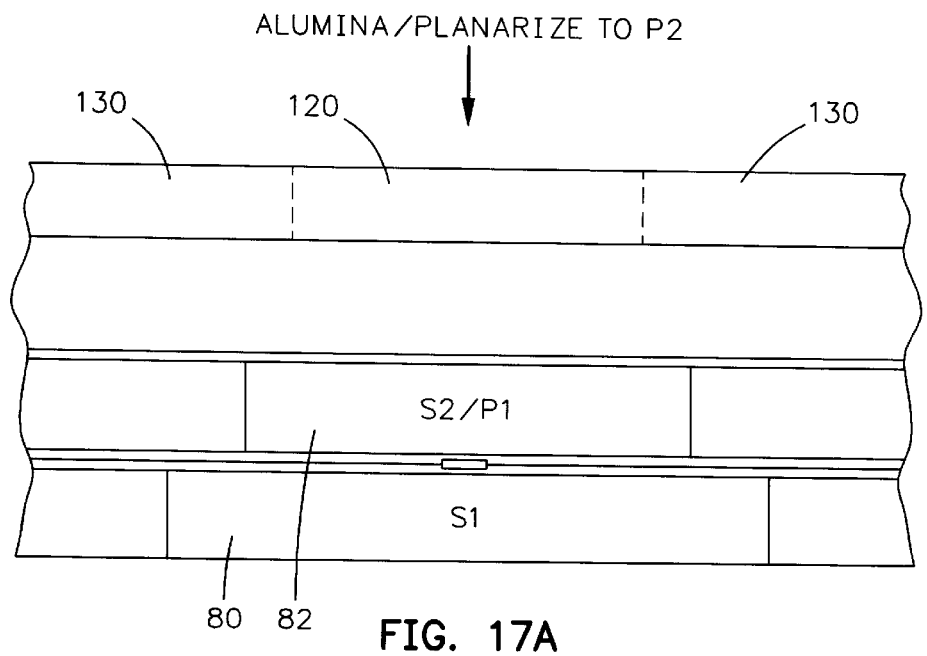
FIGS. 17A and 17B are the same as FIGS. 16A and 16B except alumina has been deposited and planarized with respect to the shaping layer.
Figure 17B:
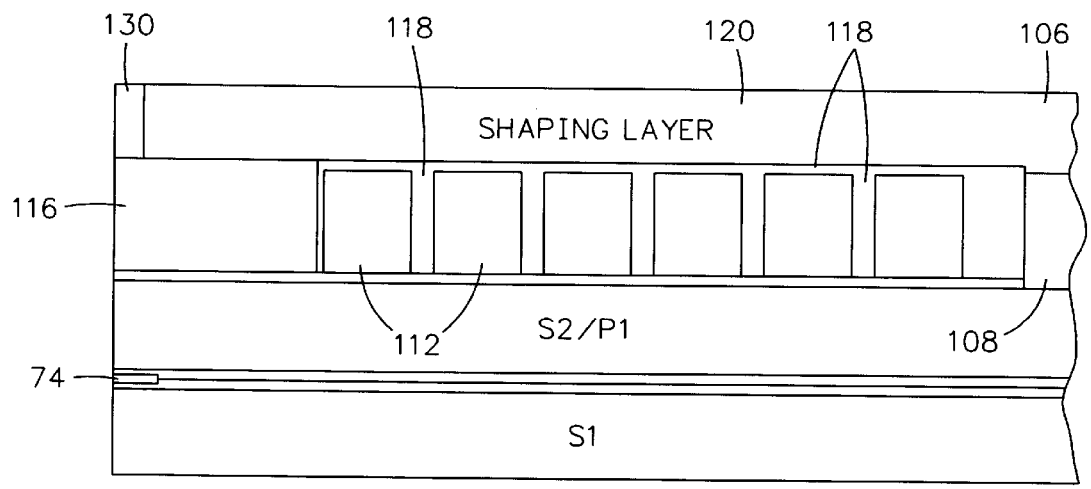
Figure 18A:
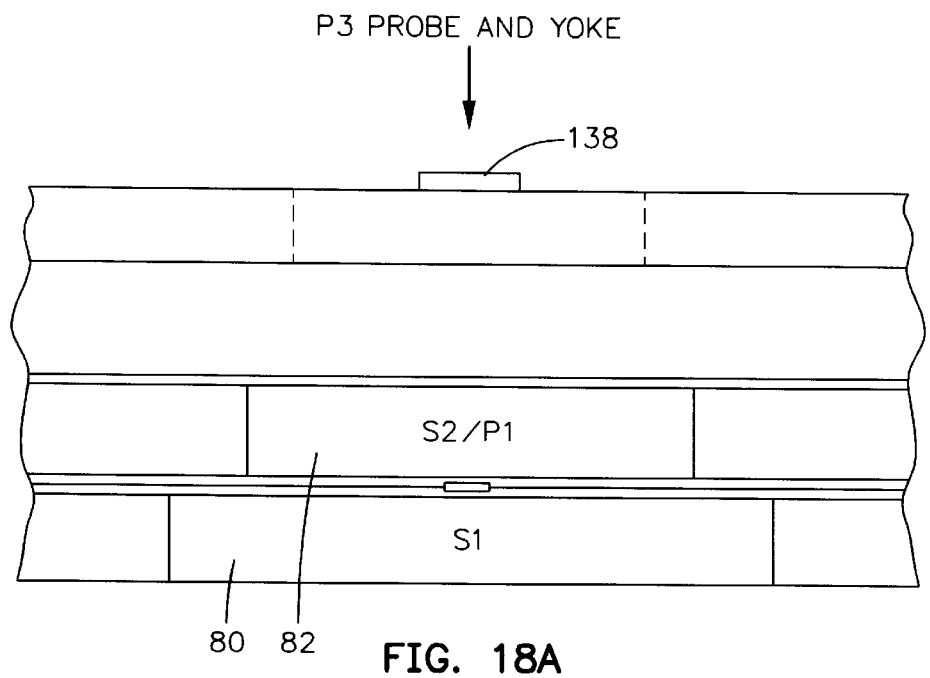
FIGS. 18A and 18B are the same as FIGS. 17A and 17B except a probe layer has been frame plated.
Figure 18B:
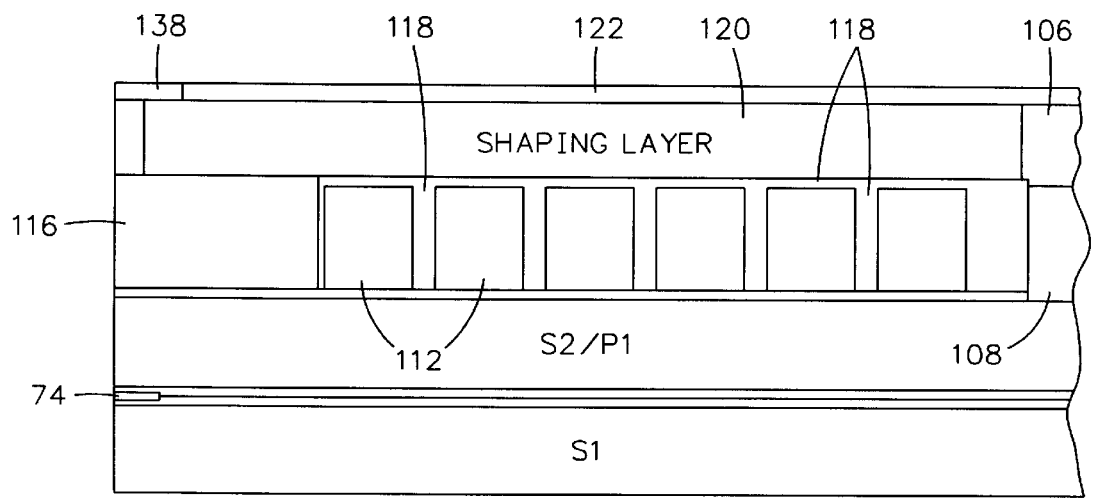
Figure 19A:
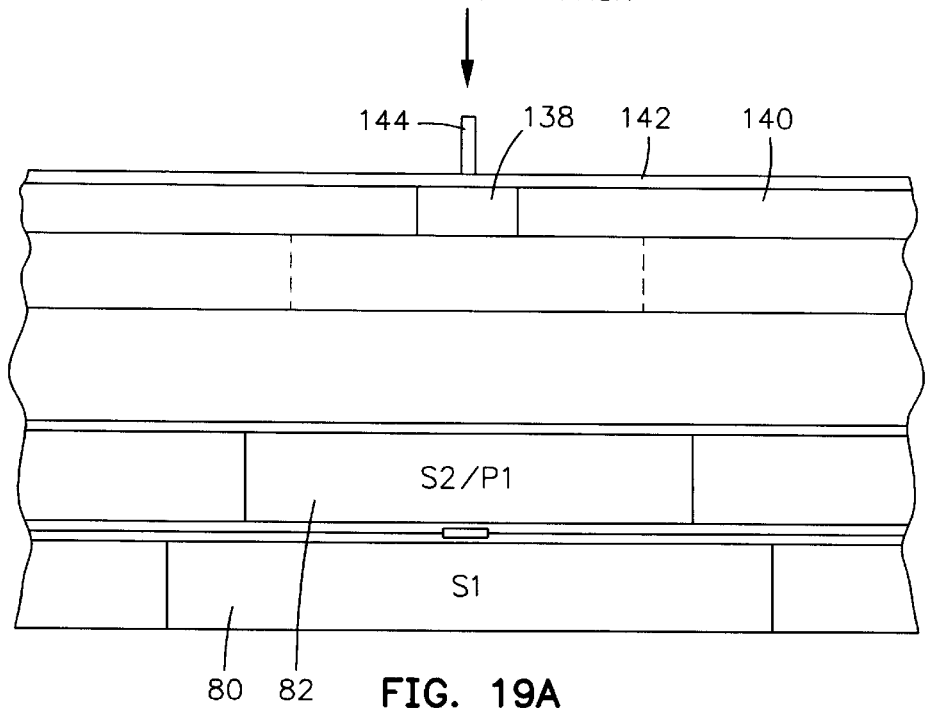
FIGS. 19A and 19B are the same as FIGS. 18A and 18B except alumina has been deposited and planarized with respect to the probe layer, a hard mask material layer has been formed and a photoresist layer has been formed with a desired track width.
Figure 19B:
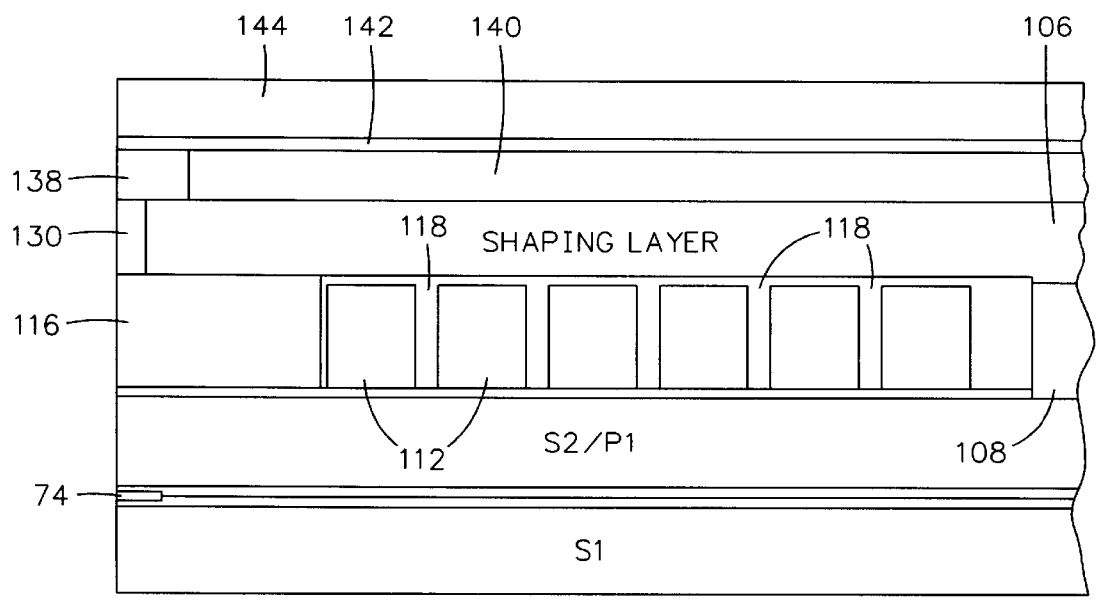

In FIGS. 16A and 16B the shaping layer 120 is frame plated with the flare point 124 slightly recessed from the ABS and the back gap 106 magnetically connected to the back gap layer 108. In FIGS. 17A and 17B a thick layer of alumina is sputter deposited on the wafer and planarized to form layer 130 with its top surface coplanar with the top surface of the shaping layer 120. In FIGS. 18A and 18B the probe layer 122 is frame plated with the probe layer having a probe material layer portion 138 which has a width which is wider than the desired track width of the write head. In contrast to that shown in FIGS. 18A and 18B, the probe layer 122 may be full film plated without patterning the layer 122 to form layer portion 138. Optionally, the frame plating may plate the probe 128 with the desired width to define the track width of the head. However, the subsequent method steps described herein are preferred for defining a high resolution narrow probe 128. In FIGS. 19A and 19B a thick layer of alumina is sputter deposited on the wafer and planarized to form a layer 140 with its top surface coplanar with the top surface of the probe material layer portion 138. This may also be accomplished with photoresist and then planarized in the same manner. A hard mask material layer 142, such as carbon C, is then formed on the layers 138 and 140. Next, a photoresist mask 144 is formed on top of the hard mask material layer 142 with a width equal to the desired track width of the write head.

Figure 20A:
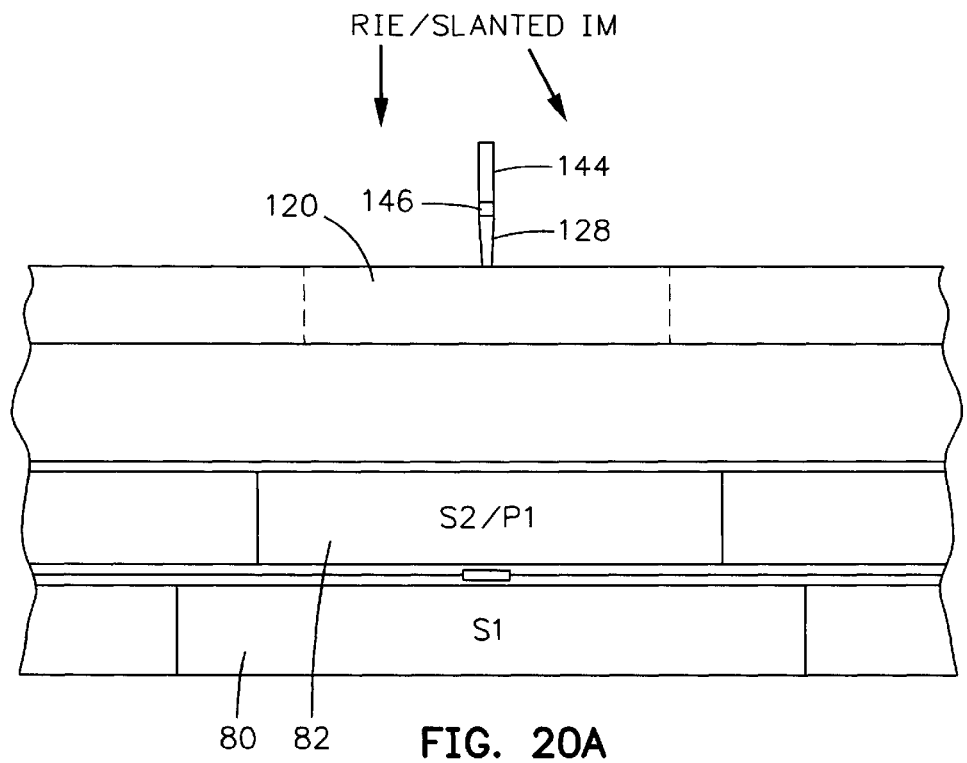
FIGS. 20A and 20B are the same as FIGS. 19A and 19B except milling has been implemented to tranfer the image of the photoresist layer into the hard mask and ion milling has been implemented to remove the probe material layer on each side of the hard mask.
Figure 20B:
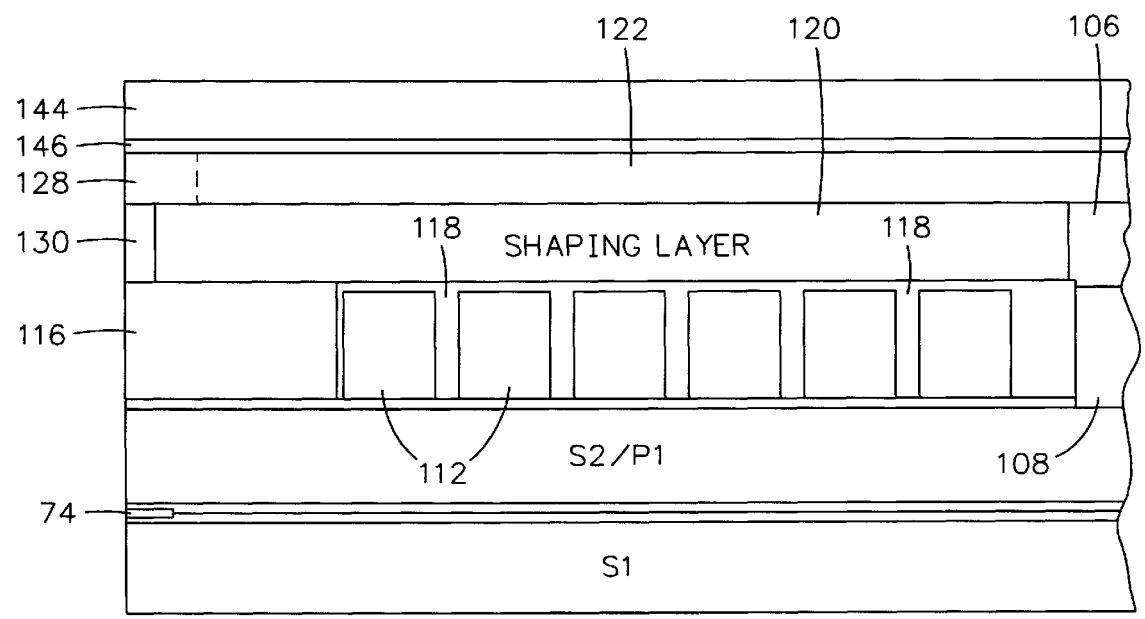
Figure 21A:
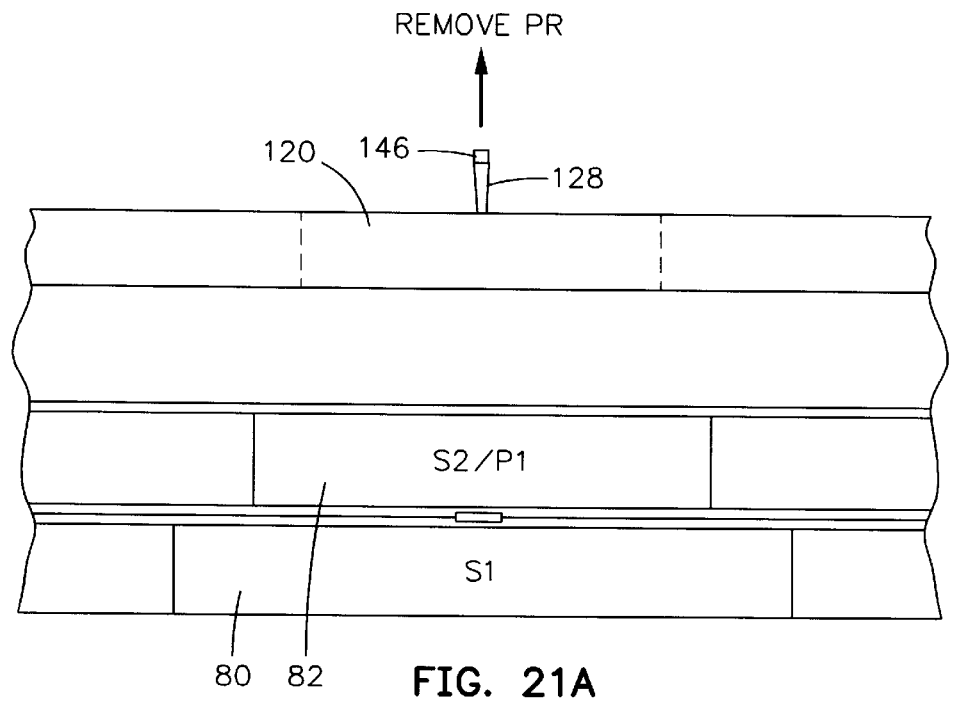
FIGS. 21A and 21B are the same as FIGS. 20A and 20B except the photoresist has been removed.
Figure 21B:
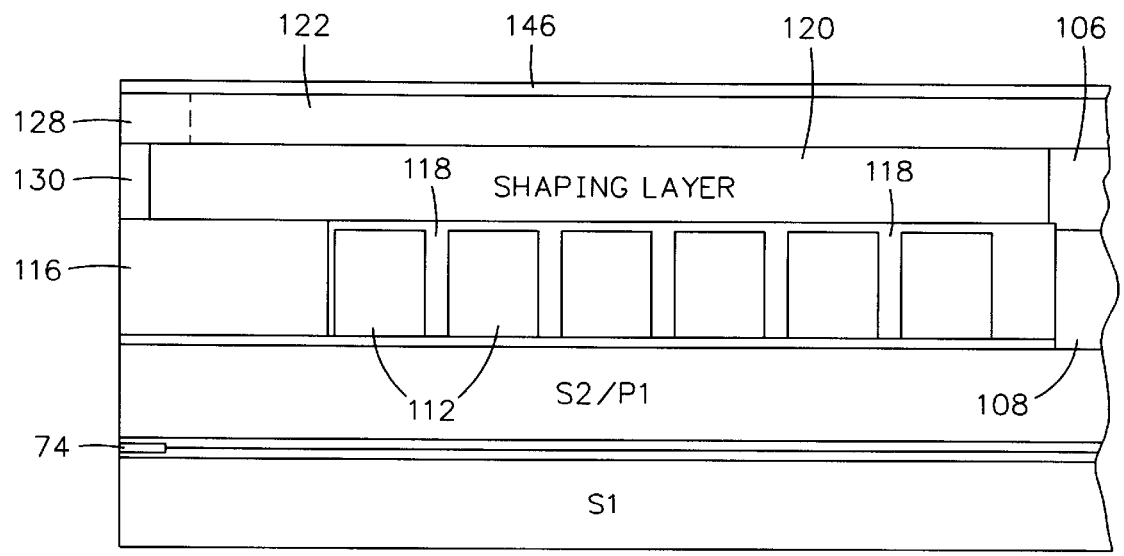

In FIGS. 20A and 20B the image of the photoresist layer 144 is transferred to the hard mask layer. This is accomplished by oxygen reactive ion etching if the hard mask layer is carbon or reactive ion etching or ion milling if the hard mask layer is alumina. This removes all portions of the hard mask material layer except for a small hard mask portion 146 above the probe material layer with a width which is equal to the desired track width of the write head. Ion milling is then implemented with or without the photoresist layer 144 to remove portions of the probe material layer except for the desired probe 128 with the desired track width. In FIGS. 21A and 21B the photoresist layer 144 has been removed and an overcoat layer 148 may be formed, as shown in FIG. 6.

Figure 22A:
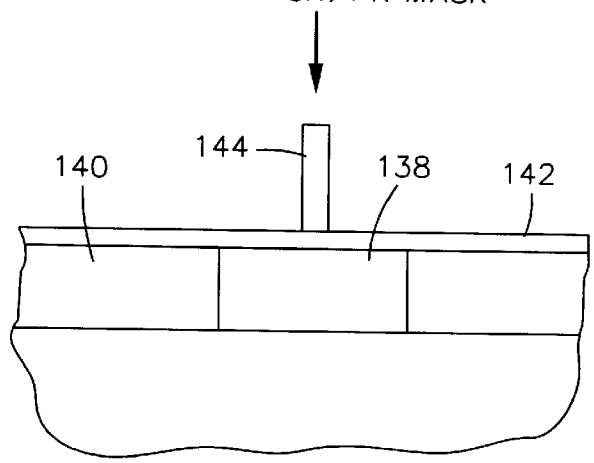
FIGS. 22A, 22B and 22C are ABS views of one embodiment of defining the track width of the probe at the ABS as shown in FIGS. 19A, 19B, 20A and 20B.
Figure 22B:
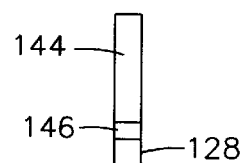
Figure 22C:
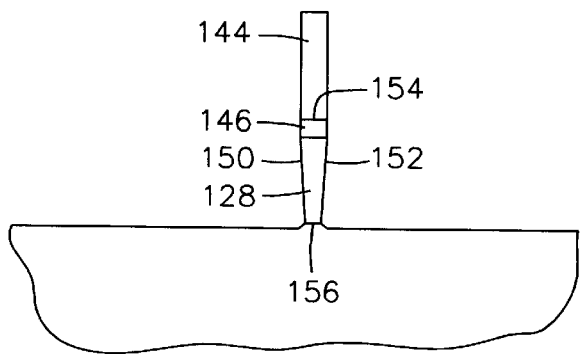
Figure 22D:
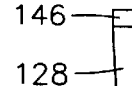

FIGS. 22A–22D illustrate one embodiment of forming the probe, as shown in FIGS. 19A, 19B, 20A and 20B. In FIG. 22A the probe material layer 138, the alumina layer 140, the hard mask material layer 142 and the photoresist layer 144 have been formed, as shown in FIGS. 19A and 19B. In FIG. 22B ion milling or reactive ion etching (RIE) has been implemented while the wafer is rotated to remove the alumina layer 140 and portions of the hard mask layer 142 leaving the hard mask 146 and the photoresist layer 144, as shown in FIGS. 20A and 20B. Oxygen reactive ion etching is implemented if the hard mask material layer 142 is carbon. Slanted ion milling is then implemented at a preferred angle from 5° to 15° to a normal to the major plane of the hard mask layer 146 while the wafer is rotated which causes the probe 128 to have slanted side walls 150 and 152 which progressively decrease in width from a top surface 154 to a bottom surface 156 of the probe. This trapezoidal shape of the probe 128 at the ABS is a preferred probe configuration so as to minimize side writing when the probe is skewed at the outer and inner circular tracks of the rotating magnetic disk. In FIG. 22D the photoresist layer 144 has been removed.

Figure 23A:
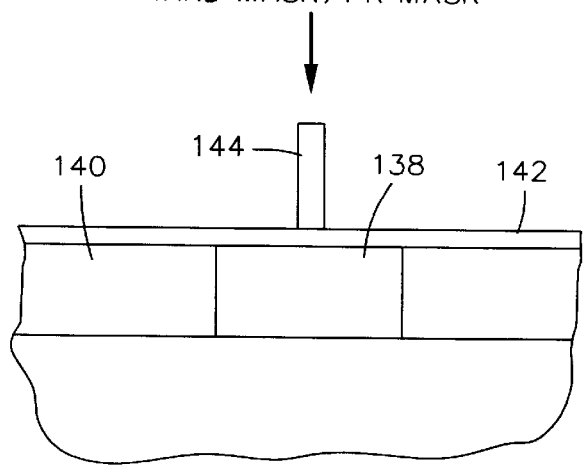
FIGS. 23A, 23B, 23C and 23D are ABS views of another embodiment of defining the track width of the probe as shown in FIGS. 19A, 19B, 20A and 20B.
Figure 23B:
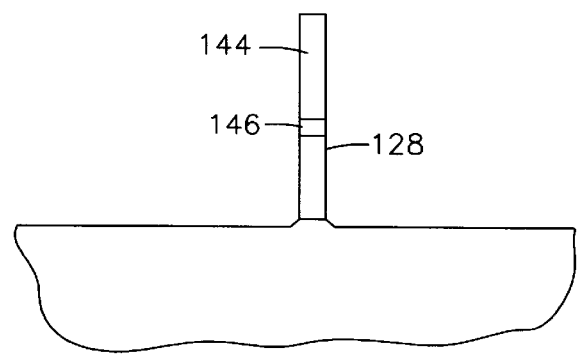
Figure 23C:
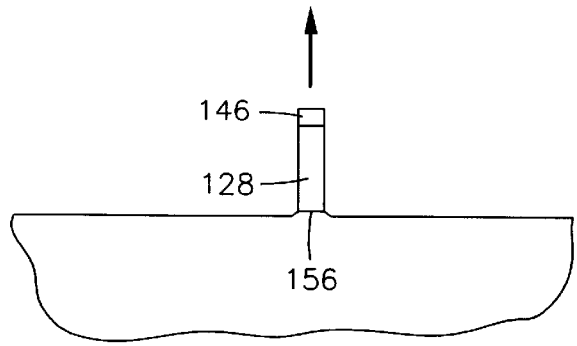
Figure 23D:
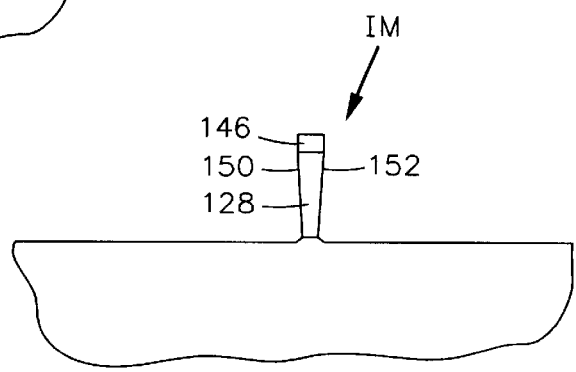

FIGS. 23A–23D illustrate a slightly different embodiment for the construction of the probe as shown in FIGS. 19A, 19B, 20A and 20B. FIG. 23A is the same as FIG. 22A. In FIG. 23B ion milling or reactive ion etching (RIE) has been implemented to remove portions of the hard mask material layer 142 except for the hard mask portion 146 which has a width equal to the desired track width of the write head. In FIG. 23C the photoresist layer 144 has been removed and in FIG. 23D the wafer is subjected to slanted ion milling, preferably 5° to 15° to a normal to the major plane surface of the hard mask 146 while the wafer is rotated which forms the slanted side walls 150 and 152 of the probe 128, as discussed hereinabove. The only difference between the steps shown in FIGS. 22A–22D and the steps shown in FIGS. 23A–23C is that in FIGS. 23A–23C the photoresist layer 144 is removed before ion milling the sloping side walls 150 and 152.

Discussion

It should be understood that vacuum deposition may be employed in lieu of the aforementioned frame plating step. Further, in a broad concept of the invention the trapezoidal shaped probe layer can be employed without the aforementioned shaping layer or the shaping layer may be employed without the trapezoidal shaped probe. The materials of the various layers are optional in some instances. For instance, photoresist may be employed in lieu of the alumina layers and vice versa. Further, while the magnetic head is planarized at various steps, planarization may occur only for the shaping and probe layers. Further, the magnetic head assembly may be a merged or piggyback head, as discussed hereinabove. The pole pieces are ferromagnetic materials and are preferably nickel iron. It should be noted that with the invention the shaping layer may be a different ferromagnetic material than the probe layer. For instance, the shaping layer may be $Ni_{45}Fe_{55}$ and the probe layer may be $Ni_{83}Fe_{17}$.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic write head having an air bearing surface (ABS), comprising:
   ferromagnetic first and second pole pieces wherein each pole piece has a back gap that is recessed from the ABS and wherein the back gaps of the first and second pole piece layers are magnetically connected;
   an insulation stack located between the first and second pole pieces and further located between the ABS and the back gaps of the first and second pole pieces;
   at least one coil layer embedded in the insulation stack and spaced from the ABS;
   the second pole piece including a ferromagnetic shaping layer and a probe layer wherein the shaping layer is located between the insulation stack and the probe layer and is recessed from the ABS;
   the probe layer having a probe, a yoke and a back gap wherein the yoke is located between the probe and the back gap and wherein said back gap of the second pole piece includes the back gap of the probe layer;
   an insulation layer located between the ABS and the shaping layer and forming a portion of the ABS and further being located between the probe and the insulation stack; and
   the probe forming a portion of the ABS and having a width that defines a track width of the write head.

2. A magnetic write head as claimed in claim 1 including:
   the probe having a height that extends normal to a major plane of the probe layer and further having a top surface and a bottom surface with the bottom surface located between the top surface and the shaping layer; and
   the probe progressively increasing in width from its bottom surface to its top surface with a width of the top surface defining said track width of the write head.

3. A magnetic write head as claimed in claim 1 including:
   each of the probe layer and the shaping layer having a flare point wherein each of the probe layer and the shaping layer first commences to flare out between the ABS and the back gap of the second pole piece and which is recessed from the ABS;
   the yoke of the probe layer having a flared portion, which commences at the flare point of the probe layer, and a widened portion with the widened portion located between the flared portion and the back gap of the probe layer; and
   the shaping layer having a flared portion, which commences at the flare point of the shaping layer, a widened portion and a back gap wherein the back gap of the second pole piece includes the back gap of the shaping layer and wherein the widened portion of the shaping layer is located between the flare portion and the back gap of the shaping layer.

4. A magnetic write head as claimed in claim 3 wherein the flare point of the shaping layer is located between the flare point of the probe layer and the ABS.

5. A magnetic write head as claimed in claim 4 including:
   the probe having first and second portions with the second portion being located between the first portion and the yoke of the probe layer; and
   the first portion of the probe interfacing the insulation layer and the second portion of the probe interfacing the flared portion of the shaping layer.

6. A magnetic write head as claimed in claim 5 including:
   the probe having a height that extends normal to a major plane of the probe layer and further having a top surface and a bottom surface with the bottom surface located between the top surface and the shaping layer; and
   the probe progressively increasing in width from its bottom surface to its top surface with a width of the top surface defining said track width of the write head.

7. A magnetic head assembly having an air bearing surface (ABS), comprising:
   a write head including:
      ferromagnetic first and second pole pieces wherein each pole piece has a back gap that is recessed from the ABS and wherein the back gaps of the first and second pole piece layers are magnetically connected;
      an insulation stack located between the first and second pole pieces and further located between the ABS and the back gaps of the first and second pole pieces;
      at least one coil layer embedded in the insulation stack and spaced from the ABS;
      the second pole piece including a ferromagnetic shaping layer and a probe layer wherein the shaping layer is located between the insulation stack and the probe layer and is recessed from the ABS;
      the probe layer having a probe, a yoke and a back gap wherein the yoke is located between the probe and the back gap and wherein said back gap of the second pole piece includes the back gap of the probe layer;
      an insulation layer located between the ABS and the shaping layer and forming a portion of the ABS and further being located between the probe and the insulation stack; and
      the probe forming a portion of the ABS and having a width that defines a track width of the write head;
   a read head including:
      a read sensor;
      nonmagnetic electrically nonconductive first and second read gap layers;
      the read sensor being located between the first and second read gap layers;
      a ferromagnetic first shield layer; and
      the first and second read gap layers being located between the first shield layer and the first pole piece layer.

8. A magnetic head assembly as claimed in claim 7 including:
   the probe having a height that extends normal to a major plane of the probe layer and further having a top surface and a bottom surface with the bottom surface located between the top surface and the shaping layer; and
   the probe progressively increasing in width from its bottom surface to its top surface with a width of the top surface defining said track width of the write head.

9. A magnetic head assembly as claimed in claim 7 including:
   each of the probe layer and the shaping layer having a flare point wherein each of the probe layer and the shaping layer first commences to flare out between the ABS and the back gap of the second pole piece and which is recessed from the ABS;

the yoke of the probe layer having a flared portion, which commences at the flare point of the probe layer, and a widened portion with the widened portion located between the flared portion and the back gap of the probe layer; and the shaping layer having a flared portion, which commences at the flare point of the shaping layer, a widened portion and a back gap wherein the back gap of the second pole piece includes the back gap of the shaping layer and wherein the widened portion of the shaping layer is located between the flare portion and the back gap of the shaping layer.

10. A magnetic head assembly as claimed in claim 9 wherein the flare point of the shaping layer is located between the flare point of the probe layer and the ABS.

11. A magnetic head assembly as claimed in claim 10 including:

the probe having first and second portions with the second portion being located between the first portion and the yoke of the probe layer; and the first portion of the probe interfacing the insulation layer and the second portion of the probe interfacing the flared portion of the shaping layer.

12. A magnetic head assembly as claimed in claim 11 including:

the probe having a height that extends normal to a major plane of the probe layer and further having a top surface and a bottom surface with the bottom surface located between the top surface and the shaping layer; and the probe progressively increasing in width from its bottom surface to its top surface with a width of the top surface defining said track width of the write head.

13. A magnetic disk drive including at least one magnetic head assembly that has an air bearing surface (ABS), comprising:

a write head including:

ferromagnetic first and second pole pieces wherein each pole piece has a back gap that is recessed from the ABS and wherein the back gaps of the first and second pole piece layers are magnetically connected;

an insulation stack located between the first and second pole pieces and further located between the ABS and the back gaps of the first and second pole pieces;

at least one coil layer embedded in the insulation stack and spaced from the ABS;

the second pole piece including a ferromagnetic shaping layer and a probe layer wherein the shaping layer is located between the insulation stack and the probe layer and is recessed from the ABS;

the probe layer having a probe, a yoke and a back gap wherein the yoke is located between the probe and the back gap and wherein said back gap of the second pole piece includes the back gap of the probe layer;

an insulation layer located between the ABS and the shaping layer and forming a portion of the ABS and further being located between the probe and the insulation stack; and the probe forming a portion of the ABS and having a width that defines a track width of the write head;

a read head including:

a read sensor;

nonmagnetic electrically nonconductive first and second read gap layers;

the read sensor being located between the first and second read gap layers;

a ferromagnetic first shield layer; and the first and second read gap layers being located between the first shield layer and the first pole piece layer;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

14. A magnetic disk drive as claimed in claim 13 including:

the probe having a height that extends normal to a major plane of the probe layer and further having a top surface and a bottom surface with the bottom surface located between the top surface and the shaping layer; and the probe progressively increasing in width from its bottom surface to its top surface with a width of the top surface defining said track width of the write head.

15. A magnetic disk drive as claimed in claim 14 including:

each of the probe layer and the shaping layer having a flare point wherein each of the probe layer and the shaping layer first commences to flare out between the ABS and the back gap of the second pole piece and which is recessed from the ABS;

the yoke of the probe layer having a flared portion, which commences at the flare point of the probe layer, and a widened portion with the widened portion located between the flared portion and the back gap of the probe layer; and the shaping layer having a flared portion, which commences at the flare point of the shaping layer, a widened portion and a back gap wherein the back gap of the second pole piece includes the back gap of the shaping layer and wherein the widened portion of the shaping layer is located between the flare portion and the back gap of the shaping layer.

16. A magnetic disk drive as claimed in claim 14 wherein a flare point of the shaping layer is located between a flare point of the probe layer and the ABS.

17. A magnetic disk drive as claimed in claim 16 including:

the probe having first and second portions with the second portion being located between the first portion and the yoke of the probe layer; and the first portion of the probe interfacing the insulation layer and the second portion of the probe interfacing a flared portion of the shaping layer.

18. A method of making a magnetic write head that has an air bearing surface (ABS) comprising the steps of:

forming ferromagnetic first and second pole pieces wherein each pole piece has a back gap that is recessed from the ABS and wherein the back gaps of the first and second pole pieces are magnetically connected;

forming an insulation stack between the first and second pole pieces and further between the ABS and the back gaps of the first and second pole pieces;

forming at least one coil layer embedded in the insulation stack and spaced from the ABS;

forming a portion of the second pole piece as a ferromagnetic shaping layer and another portion of the second pole piece as a probe layer wherein the shaping layer is located between the insulation stack and the probe layer and is recessed from the ABS;

forming the probe layer with a probe, a yoke and a back gap wherein the yoke is located between the probe and the back gap and wherein said back gap of the second pole piece includes the back gap of the probe layer;

forming an insulation layer between the ABS and the shaping layer and with the insulation layer forming a portion of the ABS and further locating the insulation layer between the probe and the insulation stack; and forming the probe to form a portion of the ABS and with a width that defines a track width of the write head.

19. A method of making a magnetic write head as claimed in claim 18 including the steps of:

planarizing a top surface of the insulation layer with respect to a top surface of the shaping layer;

said forming of the probe including forming a probe material layer on the insulation layer;

forming a hard mask on a top surface of the probe material layer;

while rotating the probe material layer about an axis that is normal to a major plane of the probe material layer ion milling at an angle to said axis until the probe material layer is formed into said probe with a progressively decreasing width from a top surface of the probe toward a bottom of the probe.

20. A method of making a magnetic write head as claimed in claim 19 wherein the hard mask is formed by the steps of:

forming a hard mask material layer;

forming a photoresist mask on the hard mask material layer covering a portion of the hard mask material layer that is to be retained as said hard mask and leaving exposed portions of the hard mask material layer; and milling until the exposed portions of the hard mask material layer are removed.

21. A method of making a magnetic write head as claimed in claim 20 wherein the hard mask is carbon or alumina.

22. A method of making a magnetic write head as claimed in claim 18 including the steps of:

forming the probe with a height that extends normal to a major plane of the probe layer and further with a top surface and a bottom surface with the bottom surface located between the top surface and the shaping layer; and forming the probe so that it progressively increases in width from its bottom surface to its top surface with the top surface defining said track width of the write head.

23. A method of making a magnetic write head as claimed in claim 18 including the steps of:

forming each of the probe layer and the shaping layer with a flare point where each of the probe layer and the shaping layer first commences to flare out between the ABS and the back gap of the second pole piece and which is recessed from the ABS;

forming the yoke of the probe layer with a flared portion, which commences at the flare point of the probe layer, and a widened portion with the widened portion located between the flared portion and the back gap of the probe layer; and forming the shaping layer with a flared portion, which commences at the flare point of the shaping layer, a widened portion and a back gap wherein the back gap of the second pole piece includes the back gap of the shaping layer and wherein the widened portion of the shaping layer is located between the flare portion and the back gap of the shaping layer.

24. A method of making a magnetic write head as claimed in claim 23 wherein the flare point of the shaping layer is formed between the flare point of the probe layer and the ABS.

25. A method of making a magnetic write head as claimed in claim 24 including the steps of:

forming the probe with first and second portions with the second portion located between the first portion and the yoke of the probe layer; and forming the first portion of the probe so that it interfaces the insulation layer and forming the second portion of the probe so that it interfaces the flared portion of the shaping layer.

26. A method of making a magnetic write head as claimed in claim 25 including the steps of:

forming the probe with a height that extends normal to a major plane of the probe layer and further with a top surface and a bottom surface with the bottom surface located between the top surface and the shaping layer; and forming the probe so that it progressively increases in width from its bottom surface to its top surface with the top surface defining said track width of the write head.

27. A method of making magnetic head assembly that has an air bearing surface (ABS), comprising the steps of:

making a write head including the steps of:

forming ferromagnetic first and second pole pieces wherein each pole piece has a back gap that is recessed from the ABS and wherein the back gaps of the first and second pole pieces are magnetically connected;

forming an insulation stack between the first and second pole pieces and further between the ABS and the back gaps of the first and second pole pieces;

forming at least one coil layer embedded in the insulation stack and spaced from the ABS;

forming a portion of the second pole piece as a ferromagnetic shaping layer and another portion of the second pole piece as a probe layer wherein the shaping layer is located between the insulation stack and the probe layer and is recessed from the ABS;

forming the probe layer with a probe, a yoke and a back gap wherein the yoke is located between the probe and the back gap and wherein said back gap of the second pole piece includes the back gap of the probe layer;

forming an insulation layer between the ABS and the shaping layer and with the insulation layer forming a portion of the ABS and further locating the insulation layer between the probe and the insulation stack; and forming the probe to form a portion of the ABS and with a width that defines a track width of the write head;

making a read head including the steps of:

forming nonmagnetic electrically nonconductive first and second read gap layers;

forming a read sensor between the first and second read gap layers;

forming a first shield layer; and forming the first and second read gap layers between the first shield layer and the first pole piece layer.

28. A method of making a magnetic head assembly as claimed in claim 27 including the steps of:

planarizing a top surface of the insulation layer with respect to a top surface of the shaping layer;

said forming of the probe including forming a probe material layer on the insulation layer;

forming a hard mask on a top surface of the probe material layer;

while rotating the probe material layer about an axis that is normal to a major plane of the probe material layer ion milling at an angle to said axis until the probe material layer is formed into said probe with a progressively decreasing width from a top surface of the probe toward a bottom of the probe.

29. A method of making a magnetic head assembly as claimed in claim 28 wherein the hard mask is formed by the steps of:

forming a hard mask material layer;

forming a photoresist mask on the hard mask material layer covering a portion of the hard mask material layer that is to be retained as said hard mask and leaving exposed portions of the hard mask material layer; and milling until the exposed portions of the hard mask material layer are removed.

30. A method of making a magnetic head assembly as claimed in claim 29 wherein the hard mask is carbon or alumina.

31. A method of making a magnetic head assembly as claimed in claim 27 including the steps of:

forming the probe with a height that extends normal to a major plane of the probe layer and further with a top surface and a bottom surface with the bottom surface located between the top surface and the shaping layer; and forming the probe so that it progressively increases in width from its bottom surface to its top surface with the top surface defining said track width of the write head.

32. A method of making a magnetic head assembly as claimed in claim 27 including the steps of:

forming each of the probe layer and the shaping layer with a flare point where each of the probe layer and the shaping layer first commences to flare out between the ABS and the back gap of the second pole piece and which is recessed from the ABS;

forming the yoke of the probe layer with a flared portion, which commences at the flare point of the probe layer, and a widened portion with the widened portion located between the flared portion and the back gap of the probe layer; and forming the shaping layer with a flared portion, which commences at the flare point of the shaping layer, a widened portion and a back gap wherein the back gap of the second pole piece includes the back gap of the shaping layer and wherein the widened portion of the shaping layer is located between the flare portion and the back gap of the shaping layer.

33. A method of making a magnetic head assembly as claimed in claim 32 wherein the flare point of the shaping layer is formed between the flare point of the probe layer and the ABS.

34. A method of making a magnetic head assembly as claimed in claim 33 including the steps of:

forming the probe with first and second portions with the second portion located between the first portion and the yoke of the probe layer; and forming the first portion of the probe so that it interfaces the insulation layer and forming the second portion of the probe so that it interfaces the flared portion of the shaping layer.

35. A method of making a magnetic head assembly as claimed in claim 34 including the steps of:

forming the probe with a height that extends normal to a major plane of the probe layer and further with a top surface and a bottom surface with the bottom surface located between the top surface and the shaping layer; and forming the probe so that it progressively increases in width from its bottom surface to its top surface with the top surface defining said track width of the write head.

36. A magnetic write head having an air bearing surface (ABS), comprising:

ferromagnetic first and second pole pieces wherein each pole piece has a back gap that is recessed from the ABS and wherein the back gaps of the first and second pole piece layers are magnetically connected;

an insulation stack recessed from the ABS, located between the first and second pole pieces and further located between the ABS and the back gaps of the first and second pole pieces;

at least one coil layer embedded in the insulation stack and spaced from the ABS;

the second pole piece including a probe layer;

the probe layer having a probe, a yoke and a back gap wherein the yoke is located between the probe and the back gap and wherein said back gap of the second pole piece includes the back gap of the probe layer;

the probe forming a portion of the ABS and having a width that defines a track width of the write head;

the probe having a height that extends normal to a major plane of the probe layer and further having a top surface and a bottom with the bottom located between the top surface and the insulation stack; and the probe progressively increasing in width from its bottom to its top surface with the top surface having said width and defining said track width of the write head.

37. A method of making a magnetic write head having an air bearing surface (ABS), comprising the steps of:

forming ferromagnetic first and second pole pieces wherein each pole piece has a back gap that is recessed from the ABS and wherein the back gaps of the first and second pole piece layers are magnetically connected;

forming an insulation stack recessed from the ABS, located between the first and second pole pieces and further located between the ABS and the back gaps of the first and second pole pieces;

forming at least one coil layer embedded in the insulation stack and spaced from the ABS;

forming the second pole piece with a probe layer;

forming the probe layer with a probe, a yoke and a back gap wherein the yoke is located between the probe and the back gap and wherein said back gap of the second pole piece includes the back gap of the probe layer;

forming the probe to form a portion of the ABS and with a width that defines a track width of the write head;

forming the probe with a height that extends normal to a major plane of the probe layer and with a top surface and a bottom with the bottom located between the top surface and the insulation stack; and forming the probe with a progressively increasing width from its bottom to its top surface with the top surface having said width and defining said track width of the write head.

38. A method of making a magnetic write head as claimed in claim 37 including the steps of:

said forming of the probe including forming a probe material layer;

forming a hard mask on a top surface of the probe material layer;

while rotating the probe material layer about an axis that is normal to a major plane of the probe material layer ion milling at an angle to said axis until the probe material layer is formed into said probe with said progressively decreasing width from a top surface of the probe toward a bottom of the probe.

39. A method of making a magnetic write head as claimed in claim 38 wherein the hard mask is formed by the steps of:

forming a hard mask material layer;

forming a photoresist mask on the hard mask material layer covering a portion of the hard mask material layer that is to be retained as said hard mask and leaving exposed portions of the hard mask material layer to be removed; and milling until the exposed portions of the hard mask material layer are removed.

40. A method of making a magnetic write head as claimed in claim 39 wherein the hard mask is carbon or alumina.

\* \* \* \* \*

UNITED STATES PATENT AND TRADEMARK OFFICE
CERTIFICATE OF CORRECTION

PATENT NO. : 6,757,141 B2 Page 1 of 1
DATED : June 29, 2004
INVENTOR(S) : Santini et al.

It is certified that error appears in the above-identified patent and that said Letters Patent is hereby corrected as shown below:

Title page,
Item [*] Notice, change "days." (first instance) to -- 223 --.

Signed and Sealed this

Twenty-first Day of December, 2004

JON W. DUDAS
*Director of the United States Patent and Trademark Office*